United States Patent [19]

Barnsley et al.

[11] Patent Number: 5,065,447

[45] Date of Patent: Nov. 12, 1991

[54] METHOD AND APPARATUS FOR PROCESSING DIGITAL DATA

[75] Inventors: Michael F. Barnsley; Alan D. Sloan, both of Atlanta, Ga.

[73] Assignee: Iterated Systems, Inc., Norcross, Ga.

[21] Appl. No.: 375,840

[22] Filed: Jul. 5, 1989

[51] Int. Cl.[5] .............................................. G06K 9/00
[52] U.S. Cl. .................................... 382/56; 358/433; 358/467; 382/27; 382/30
[58] Field of Search ................... 382/8, 27, 56, 34, 30, 382/41; 358/433, 467; 364/518

[56] References Cited

U.S. PATENT DOCUMENTS

| 3,898,617 | 8/1975 | Kashioka et al. | 382/8 |
| 4,281,312 | 7/1981 | Knudson | 382/27 |
| 4,831,659 | 5/1989 | Miyaoka et al. | 382/56 |
| 4,941,193 | 7/1990 | Barnsley et al. | 382/56 |

OTHER PUBLICATIONS

Hidden Variable Fractal Interpolation Functions, by Barnsley et al., School of Mathematics, Georgia Institute of Technology, Atlanta, GA. 30332, Jul., 1986.
Iterated Function Systems and The Global Construction of Fractals, Proc. R. Soc. Lond., A399, 243–275 (1985).
Solution of an Inverse Problem for Fractals and Other Sets, Proc. Natl. Acad. Sci. U.S.A., vol. 83, 1975–1977 (Apr. 1986).
A New Class of Markov Processes for Image Encoding, School of Mathematics, Georgia Inst. of Technology (1988), pp. 14–32.
Fractal Modelling of Biological Structures, Perspectives in Biological Dynamics and Theoretical Medicine, Koslow, Mandell, Shlesinger, eds., Annals of New York Academy of Sciences, vol. 504, 179–194 (date unknown).
An Ergodic Theorem for Iterated Maps, Ergodic Theory and Dynamical Systems, 7 (1987).
Construction of Fractal Objects with Iterated Function Systems, Siggraph '85 Proceedings, vol. 19, No. 3, 271–278 (1985).
Fractal Modelling of Real World Images, Lecture Notes for Fractals: Introduction, Basics and Perspectives, Siggraph (1987).
Packing It In-Fractals..., Science News, vol. 131, No. 18, pp. 283–285, May 2, 1987.
Fractal Geometry-Understanding Chaos, Georgia Tech Alumni Magazine, p. 16 (Spring 1986).
Fractals-A Geometry of Nature, Georgia Institute of Technology Research Horizons, p. 9 (Spring 1986).
Fractal Modelling of Biological Structures, School of Mathematics, Georgia Institute of Technology (date unknown).
Packing It In by Ivars Peterson, Science News, vol. 131, No. 18, p. 283, May 2, 1987.
A Better Way to Compress Images, by Barnsley et al., Byte Magazine, Jan. 1988.
Researchers Ues Fractal Geometry..., by Skip Derra, Research and Development Magazine, Mar. 1988.
Data Compression: Pntng by Numbrs, The Economist, May 21, 1988.
Just the Bare Facts, Please, by William Baldwin, Forbes Magazine, Dec. 12, 1988.
Harnessing Chaos For Images Systhesis, by Barnsley et al., Computer Graphics, vol. 22, No. 4, 8/1988.
Chaotic Compression, by Barnsley et al., Computer Graphics World, Nov. 1987.
Making a New Science, pp. 215, 239, by James Gleick, date unknown.

Primary Examiner—Leo H. Boudreau
Attorney, Agent, or Firm—Finnegan, Henderson, Farabow, Garrett & Dunner

[57] ABSTRACT

Digital image data is automatically processed by dividing stored image data into domain blocks and range blocks. The range blocks are subjected to processes such as a shrinking process to obtain a mapped range blocks. Then, for each domain block, the mapped range block which is most similar to the domain block is determined, and the address of that range block and the processes the block was subjected to are combined as an identifier which is appended to a list of identifiers for other domain blocks. The list of identifiers for all domain blocks is called a fractal transform and constitutes a compressed representation of the input image. To decompress the fractal transform and recover the input image, an arbitrary input image is formed into range blocks and the range blocks processed in a manner specified by the identifiers to form a representation of the original input image.

38 Claims, 28 Drawing Sheets

FIG. 10
BLACK AND WHITE BLOCK f
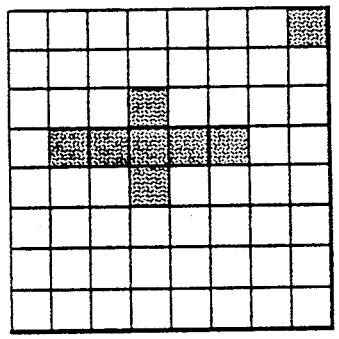
BLACK AND WHITE BLOCK g
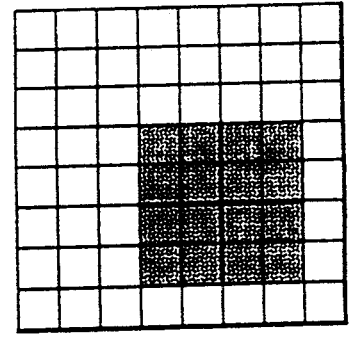
BINARY BLOCK f
| 0 | 0 | 0 | 0 | 0 | 0 | 0 | 1 |
|---|---|---|---|---|---|---|---|
| 0 | 0 | 0 | 0 | 0 | 0 | 0 | 0 |
| 0 | 0 | 0 | 1 | 0 | 0 | 0 | 0 |
| 0 | 1 | 1 | 1 | 1 | 1 | 0 | 0 |
| 0 | 0 | 0 | 1 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
BINARY BLOCK g
| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 1 | 1 | 1 | 1 | 0 |
| 0 | 0 | 0 | 1 | 1 | 1 | 1 | 0 |
| 0 | 0 | 0 | 1 | 1 | 1 | 1 | 0 |
| 0 | 0 | 0 | 1 | 1 | 1 | 1 | 0 |
| 0 | 0 | 0 | 0 | 0 | 0 | 0 | 0 |
DISTANCE TABLE FOR f
| 4 | 3 | 3 | 2 | 3 | 2 | 1 | 0 |
|---|---|---|---|---|---|---|---|
| 3 | 2 | 2 | 1 | 2 | 2 | 2 | 1 |
| 2 | 1 | 1 | 0 | 1 | 1 | 2 | 2 |
| 1 | 0 | 0 | 0 | 0 | 0 | 1 | 2 |
| 2 | 1 | 1 | 0 | 1 | 1 | 2 | 3 |
| 3 | 2 | 2 | 1 | 2 | 2 | 3 | 4 |
| 4 | 3 | 3 | 2 | 3 | 3 | 4 | 5 |
| 5 | 4 | 4 | 3 | 4 | 4 | 5 | 6 |
DISTANCE TABLE FOR g
| 5 | 4 | 3 | 3 | 3 | 3 | 3 | 4 |
|---|---|---|---|---|---|---|---|
| 4 | 3 | 2 | 2 | 2 | 2 | 2 | 3 |
| 3 | 2 | 1 | 1 | 1 | 1 | 1 | 2 |
| 3 | 2 | 1 | 0 | 0 | 0 | 0 | 1 |
| 3 | 2 | 1 | 0 | 0 | 0 | 0 | 1 |
| 3 | 2 | 1 | 0 | 0 | 0 | 0 | 1 |
| 3 | 2 | 1 | 0 | 0 | 0 | 0 | 1 |
| 4 | 3 | 2 | 1 | 1 | 1 | 1 | 2 |
DISTANCE TABLE FOR f
INTERSECTED
BINARY BLOCK FOR g
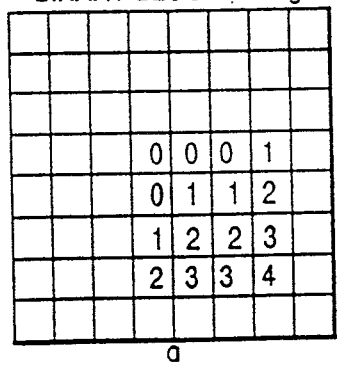
a
DISTANCE TABLE FOR g
INTERSECTED
BINARY BLOCK FOR f
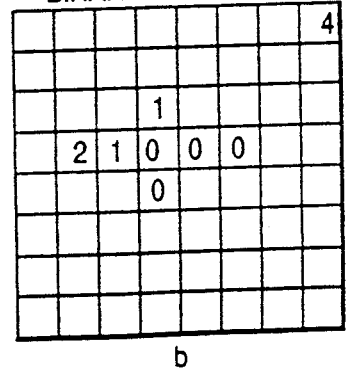
b

FIG. 11

| ADDRESS OF SHRUNK RANGE BLK. [#3] | ADDRESS OF SHRUNK RANGE BLK. [#5(90)] | ADDRESS OF SHRUNK RANGE BLK. [E] | ADDRESS OF SHRUNK RANGE BLK. |
|---|---|---|---|
| ADDRESS OF SHRUNK RANGE BLK. | ADDRESS OF SHRUNK RANGE BLK. | ADDRESS OF SHRUNK RANGE BLK. | ADDRESS OF SHRUNK RANGE BLK. |
| ADDRESS OF SHRUNK RANGE BLK. | ADDRESS OF SHRUNK RANGE BLK. | ADDRESS OF SHRUNK RANGE BLK. | ADDRESS OF SHRUNK RANGE BLK. |
| ADDRESS OF SHRUNK RANGE BLK. | ADDRESS OF SHRUNK RANGE BLK. | ADDRESS OF SHRUNK RANGE BLK. | ADDRESS OF SHRUNK RANGE BLK. |

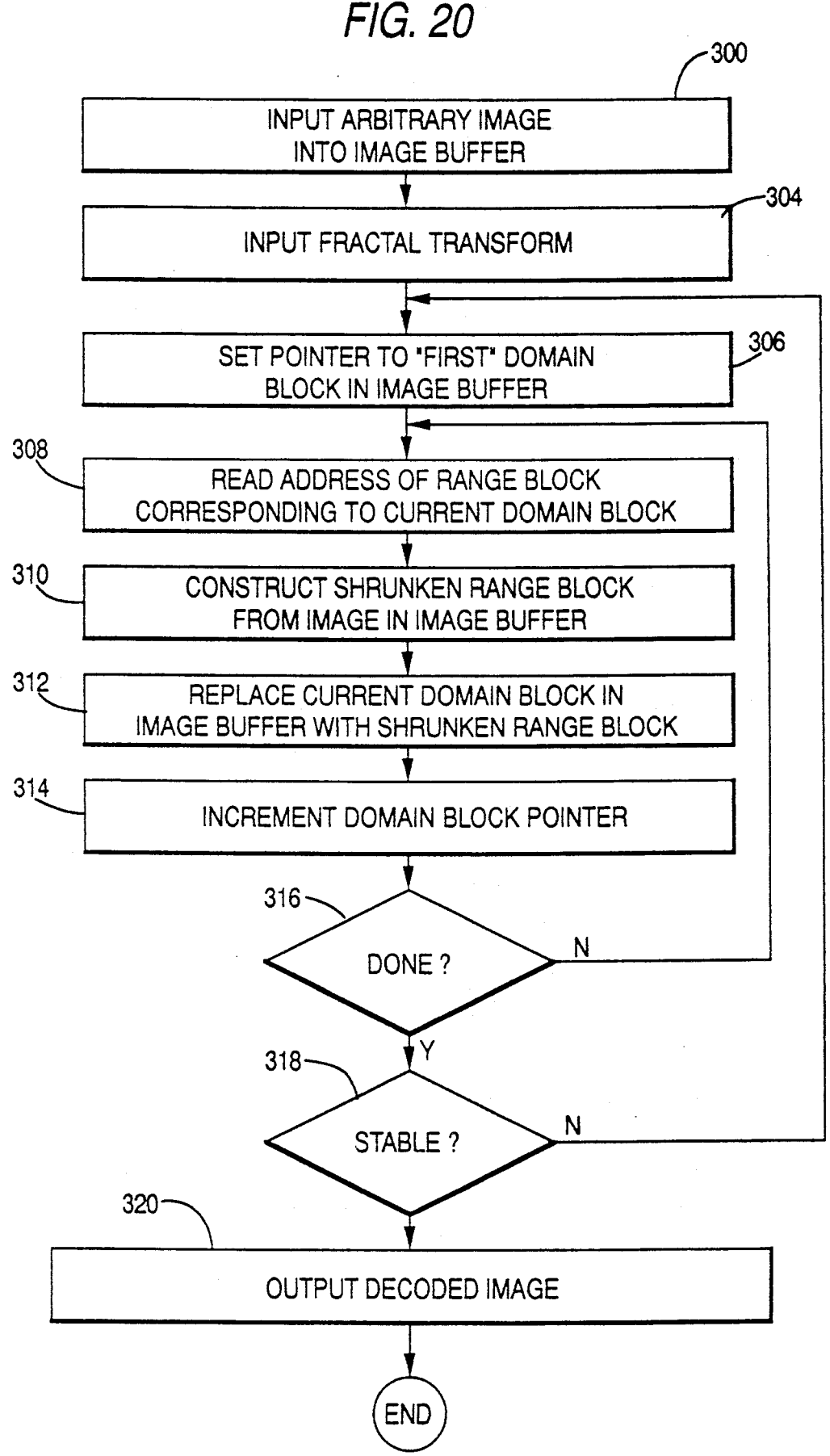

ORIGINAL IMAGE (BINARY)

|2|2|2|2|2|2|2|3|
|2|2|2|0|2|2|2|2|
|2|2|2|0|0|1|2|2|
|3|2|2|0|0|1|2|2|
|3|2|2|0|0|1|2|2|
|3|3|2|0|0|1|2|2|
|3|3|2|1|1|1|2|2|
|3|3|3|3|3|2|2|2|

402

406

SHRUNKEN RANGE BLOCKS

| #1 | #2 | #3 | #4 |
|---|---|---|---|
| 3 1 / 3 2 | 0 2 / 2 2 | 2 1 / 2 1 | 2 2 / 0 2 |
| XTRANS=0 YTRANS=0 | XTRANS=4 YTRANS=0 | XTRANS=0 YTRANS=4 | XTRANS=4 YTRANS=4 |

404

DOMAIN BLOCKS

| #1 | #2 | #3 | #4 |
|---|---|---|---|
| 3 3 / 3 3 | 2 1 / 3 3 | 1 1 / 3 2 | 2 3 / 2 3 |

| #5 | #6 | #7 | #8 |
|---|---|---|---|
| 3 2 / 3 3 | 2 0 / 2 0 | 0 1 / 0 1 | 2 2 / 2 3 |

| #9 | #10 | #11 | #12 |
|---|---|---|---|
| 2 2 / 3 2 | 2 0 / 2 0 | 0 1 / 0 1 | 2 2 / 2 2 |

| #13 | #14 | #15 | #16 |
|---|---|---|---|
| 2 2 / 2 2 | 2 2 / 2 0 | 2 2 / 2 2 | 2 3 / 2 2 |

406

GREYSCALE FRACTAL TRANSFORM 408

| DOMAIN BLOCK # | RANGE BLOCK # | P | Q | (DISTANCE) |
|---|---|---|---|---|
| 1 | 1 | 0.5 | 1 | (10) |
| 2 | 1 | 0.5 | 1 | (2) |
| 3 | 1 | 0.5 | 0 | (3) |
| 4 | 1 | 0.5 | 1 | (6) |
| 5 | 1 | 0.5 | 1 | (6) |
| 6 | 1 | 0.5 | 1 | (1) |
| 7 | 2 | 0.5 | 0 | (1) |
| 8 | 1 | 0.5 | 0 | (6) |
| 9 | 1 | 0.5 | 0 | (5) |
| 10 | 1 | 0.5 | 0 | (1) |
| 11 | 2 | 0.5 | 0 | (1) |
| 12 | 3 | 0.5 | 1 | (2) |
| 13 | 3 | 0.5 | 1 | (2) |
| 14 | 1 | 0.5 | 0 | (3) |
| 15 | 3 | 0.5 | 1 | (3) |
| 16 | 2 | 0.5 | 1 | (2) |

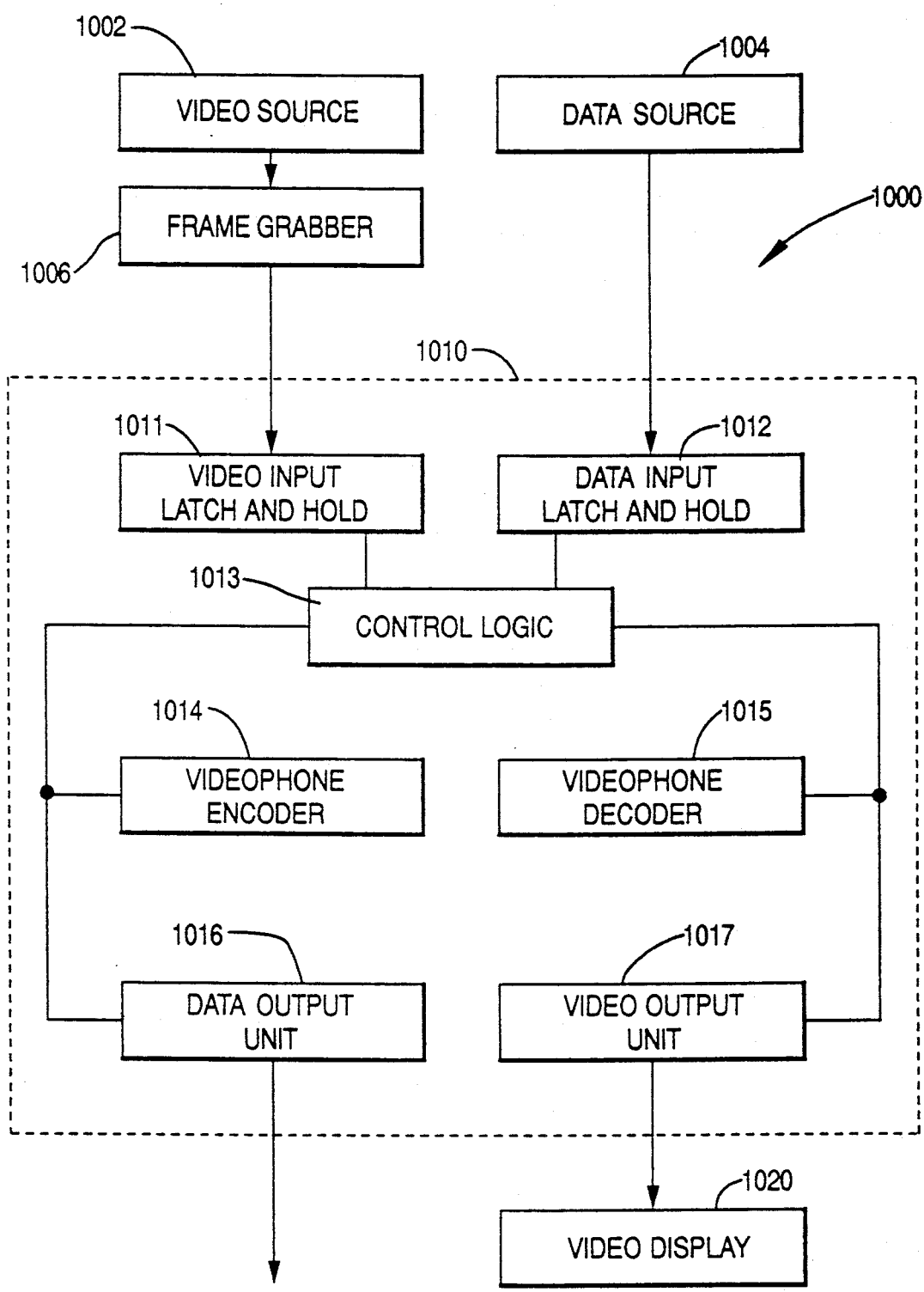

METHOD AND APPARATUS FOR PROCESSING DIGITAL DATA

BACKGROUND OF THE INVENTION

The present invention relates generally to image processing and, more particularly, to methods and apparatus which employ contractive transformations for representing images and compressing image data.

There is a collection of important problems related to the way in which computers and other digital devices deal with images. Broadly, this subject is referred to as "digital image processing," and covers the analysis, storage, and communication of images by means of digital devices. Four specific areas within the broad subject of digital image processing which are of particular interest are image compression, image representation, image recognition, and image analysis.

The present invention is applicable to all four of these areas. However, the issues involved in each area are extensive and complex. Therefore, only two of the areas, image compression and image recognition, will be discussed, to provide a background of the advantages of the present invention.

IMAGE COMPRESSION

To understand the problem of image compression, consider an image, such as a photograph of a person or a natural scene, represented as an array of 1024×1024 picture elements, or pixels. The pixels may be black and white or various shades of gray. If there are two hundred fifty six possible shades of gray, then the image can be completely described in digital terms by a binary string of 1024×1024×8 binary digits (bits) each having a value of one or zero. Such a representation of an original scene is known as a "digitized" image, since it consists of binary digits and is suitable for processing by a digital computer. The bits are commonly formed together into eight-bit groups know as "bytes" and stored together as a "data file" for use by digital devices such as computers.

If no compression is used, more than one million bytes of memory are required by a computer simply to store a single image as described above. Image compression involves decreasing the number of bits required to represent an image in such a way that either an exact replica of the image (termed "lossless compression") or an approximate replica (termed "lossy compression") of the image can be retrieved.

There are four main reasons for desiring effective compression of a data file representing an image. First, the speed of transmission of a data file is essentially proportional to its size. The larger the file, the longer it takes to transmit. Second, the storage space required is proportional to the file size. To store files representing sixty uncompressed images of the type mentioned above requires sixty megabytes of storage space. If the representation of the image can be compressed fifty percent, twice as many images can be kept in the same storage space. Third, compressed images cost less to transmit, process, archive, and retrieve than uncompressed images. Fourth, compressed images can be processed faster than uncompressed images. For example, suppose a sample image is compared against a library of stored images to determine whether a wren appears in the sample image. Although the only difference between the images may be a tiny bird, to detect this difference using uncompressed data, the files representing the images would need to be compared bit by bit, pixel by pixel. If the images were properly compressed, the comparison may proceed more quickly. For this fourth reason, if no other, data compression is likely to play an important role in knowledge based computing systems.

Examples of current needs for effective compression are as follows:

(1) Transmission of medical images by telephone. This includes high resolution medical X-rays and CAT-scans. Medical advice could be sought from a number of consultants in remote locations, provided that the transmission costs are sufficiently low and the transmission times are sufficiently short.

(2) Sending video data from computer to computer by telephone. In many situations remote computers are linked by telephone lines using a modem. The communication between computers is limited by the "bandwidth" of the line between the computers and the speed of the modem. For standard telephone lines, the highest speeds with which computers can transfer data from one to another is 9600 bits/second. If a single video image is resolved into 128×128×8, or 131,076 bits, at 30 frames/second the video information is generated at 3,932,160 bits/second. Accordingly a compression ratio of 409:1 is needed for this application.

(3) 64 Kilobit/second telephone communication lines for video transmission. The goal is to be able to allow consumers to access movies on demand. The quality of the video demanded is high. Accordingly a good means of compression is required.

(4) High definition television (HDTV), and advanced television (ATV). It is probable that the United States will require that any form of HDTV must be compatible with NTSC signals, the standard broadcast television signals currently transmitted in the U.S. HDTV will provide images having about twice the horizontal and vertical resolution of NTSC television images. To achieve this, it has been proposed that additional bandwidth be used by broadcasting stations. Such additional bandwidth would not be required if effective means for image compression were available and the additional image data required for HDTV could be transmitted via existing communication bands.

(5) Digital Video Interaction (DVI) type applications. The goal is to store as much video image data as possible on a medium such as an optical disk. The higher the compression which can be achieved, the more applications of interactive retrieval at video rates become practical.

(7) More efficient FAX (facsimile) transmission. Current FAX machines transmit a page of text in about 15 seconds. Although some compression of black-and-white imagery is achieved by Type 3 FAX machines, an increase in the compression ratio by a factor of ten would permit text transmission via FAX at the rate of 40 pages a minute. This would result in significant financial savings.

(8) More efficient data retrieval. As the amount of data stored in a computer becomes larger, the access time to retrieve that data increases, because of the greater size of the data files. Image compression can be used to speed up the access to data by decreasing the amount of memory which must be searched to retrieve it.

Prior art methods and apparatus for exact compression achieve ratios of between 0.5 and 0.1. That is, the number of bits required to store and reproduce an exact copy of an original image is between one half and one tenth the original number of bits. Such performance is clearly not sufficient to meet the requirements of some of the current applications listed above.

Moreover, some prior art digital data compression methods, while suitable for certain applications, are computationally complex, and thus may require many hours of manual operation of a computer to achieve compressed data.

Still other prior art data compression methods employ look-up tables as part of the compression procedure. Procedures using look-up tables can be useful in certain applications, such as where the class of images being compressed is small. However, use of look-up tables can limit the ability to provide adaptive capabilities useful in applications such as general purpose video processing including large numbers of diverse images and other applications where the image class cannot be narrowed down in advance. When the class of images to be compressed is large, the look-up tables also have to be very large, requiring the use of extremely large amounts of system memory. Moreover, compression ratios are decreased as the size of the look-up table is increased.

Accordingly, improved methods and apparatus for image data compression are required.

IMAGE RECOGNITION

Another important problem in digital image processing concerns the representation of images in a computer. Real world images that we perceive are not digital, i.e., discrete. Instead, these images have a continuous extended nature. An image in the mind's eye is viewed as being endlessly magnifiable. For example, if we think of a small image such as a tiny black cat, we begin with the concept of "black cat" and perceive in the mind a small black shaped silhouette. If we think of the image as being continuously enlarged, additional details appear in the image in the mind, such as textured fur and whiskers. We are able, in our minds, to continuously enlarge the image to provide whatever level of detail is necessary.

Computers, on the other hand have this ability to only the most rudimentary degree. It is currently possible, for example, to define only simple images, such as a line, in a computer such that the image retains a high level of detail at any magnification. This is done by storing in the computer a definition of, for example, a line, which specifies the very essence of the line without specifying its qualities at any particular level of magnification. The line is defined in the computer as the concept of a geometric entity extending between two specified points. When desired, this definition is used to produce an image at any required degree of magnification.

If the screen on which an image of the stored definition of the line is to be displayed has a resolution capability of, for example, three hundred dots per inch and the line image is desired to be displayed as an image two inches long, an image is displayed consisting of a display pattern six hundred dots long and, for example, three dots wide. If a larger image is desired to be displayed from the same stored definition of a line, the screen may show an image three dots wide and twelve hundred dots long. It would be desirable to provide a method for representing complex images, such as a black cat, in a computer with the same type of scale-independent resolution.

There is thus a need for a way of representing images in a computer which, although they are input and output using digital devices and are stored in digital form, are actually encoded in a manner which allows the image to be handled as though it were continuous. The solution to this problem would mean that computers treat images in a manner more analogous to the way in which the human mind stores and analyzes images. This solution is believed to be central to many important problems involving image recognition and analysis by digital computational devices. Applications of image representation include:

(1) Recognition of what is in an image.

(2) Pattern recognition applications.

(3) Check reading machines. An image representation system would allow the recognition of signatures, and the blanking out of extraneous background material.

(4) Machines for detecting man-made objects in an image.

(5) Image analyzers mounted on earth-orbiting satellites for spotting forest fires and monitoring deforestation activities.

(6) Passive transponders for use in supermarkets.

(7) Systems for receiving images at one resolution and outputting them at a higher resolution, such as line art, photographs, and image enhancement systems.

(8) Automatic devices for recognizing people's faces. These may be used in security applications.

(9) High Definition Television. Specific applications include image enhancement, use of the vertical blanking interval to provide additional information, and transmission of compressed image representation data for high-definition images.

(10) Analysis of images of roots of plants for the purpose of providing scientific data concerning the root.

It is therefore desirable to provide an efficient means for image representation which allows digital representation which is resolution independent, and which does not inherently describe discrete images, but rather describes analog (continuous) images. The representation method should apply equally well to digital as to analog images.

It is similarly desirable to develop image compression methods and apparatus whose input is a set of data, corresponding to a two-dimensional array of numerical attributes of a digitized picture, and whose output is a smaller data set from which the original can be regenerated exactly or approximately. It is further desirable to provide improved image compression methods and apparatus which can be employed for exact or non-exact image representation, and which are capable of improving compression ratios by up to several orders of magnitude. Such methods and apparatus should produce digital data which correspond to a given image, and should employ the digital data for image compression, communication, analysis or storage, and subsequent regeneration. Moreover, such methods and apparatus should be capable of representing color and intensity information as an additional dimension of the image, and allow compression and decompression of this color information.

It is also desirable to provide methods and apparatus for automatic determination of parameters which constitute a compressed data set representing an original image and which are capable of producing an approximate representation of the original image by applying the compressed data set to a set of data representing an arbitrary starting image.

It is also desirable to provide methods and apparatus for compressing and decompressing digital data representative of motion pictures using the fractal transform.

Finally, it is desirable to provide methods and apparatus to produce images which, after multiple passes through the complete encoding and decoding process, emerge the same as if they had only been through the process once, and which provide a means for expanding images to higher resolution.

SUMMARY OF THE INVENTION

Briefly described, the present invention provides improved methods and apparatus for representing image data in a compressed form in a self-referential manner. The compressed data set is formed in a digital computer by a process of repeated comparisons between image data representing different small pieces of the image, known as domain blocks and shrunken range blocks, and recording the addresses of optimal matches. The image is decoded by an inverse process.

The preferred embodiment of the present invention employs mathematical operations known as local affine transformations. These transformations are employed in the process of encoding digital data representing an image. The encoded output constitutes a "fractal transform" of an image and consists of coefficients of the affine transformations. Different fractal transforms correspond to different images.

The fractal transforms are iteratively processed in the decoding operation. Contrary to intuitive expectation, it has been discovered that if the encoding and decoding procedures of the invention are followed, the original image, or an image that looks like the original image, is produced after a finite number of iterations.

In accordance with the purpose and principles of the invention, there is provided a method for automatically processing digital image data consisting of image information. The method comprises the steps, performed by a data processor, of storing the image data in the data processor and generating a plurality of uniquely addressable domain blocks from the stored image data, with each of the domain blocks representing a different portion of the image information such that all of the stored image information is in at least one of the domain blocks. The method comprises the additional steps of creating, from the stored image data, a plurality of uniquely addressable mapped range blocks corresponding to different subsets of the image data and each of the subsets having a unique address, the creating step including the substep of executing, for each of the mapped range blocks, a corresponding procedure upon the one of the subsets of the image data which correspond to the mapped range block. The method further comprises the steps of assigning to the mapped range blocks unique identifiers each specifying both the corresponding procedure and the address of the corresponding subset of image data, selecting the mapped range blocks which most closely correspond the domain blocks according to predetermined criteria, and representing the image information as a set of the unique identifiers corresponding to the selected mapped range blocks.

In another aspect, the invention provides a method for generating an image by a data processor from a set of identifiers, the data processor including a memory having a plurality of buffers each having a plurality of addressable areas specified by a buffer address, and each of the identifiers corresponding to an addressable area in the buffers and including both a procedure and a buffer address. The method comprises the steps, performed by a data processor, of storing a predetermined pattern of digital data in one of the buffers designated as a source buffer; determining for the identifiers patterns of data corresponding to each identifier by applying the procedure in that identifier to the portion of the source buffer indicated by the buffer address in that identifier; storing into each of the addressable areas of another one of the buffers, designated as a destination buffer, the corresponding pattern of data for the identifier corresponding to that addressable portion; repeating the preceding two steps with the destination buffer considered as the source buffer until predetermined criteria are met; and providing the contents of the destination buffer as data representative of an image when the predetermined criteria are met.

BRIEF DESCRIPTION OF THE DRAWINGS

The accompanying drawings, which are incorporated in and constitute a part of this specification, illustrate embodiments of the invention, and, together with the description, serve to explain the principles of the present invention.

FIGS. 10 shows the process of producing a Hausdorff distance;

FIG. 11 shows a fractal transform of the image of FIG. 1;

FIG. 20 is a logic flow chart of an alternative to the method shown in FIG. 19, in which only a single image buffer is used;

FIG. 34 is a block diagram of videophone apparatus.

DESCRIPTION OF THE PREFERRED EMBODIMENT

Figure 1A:
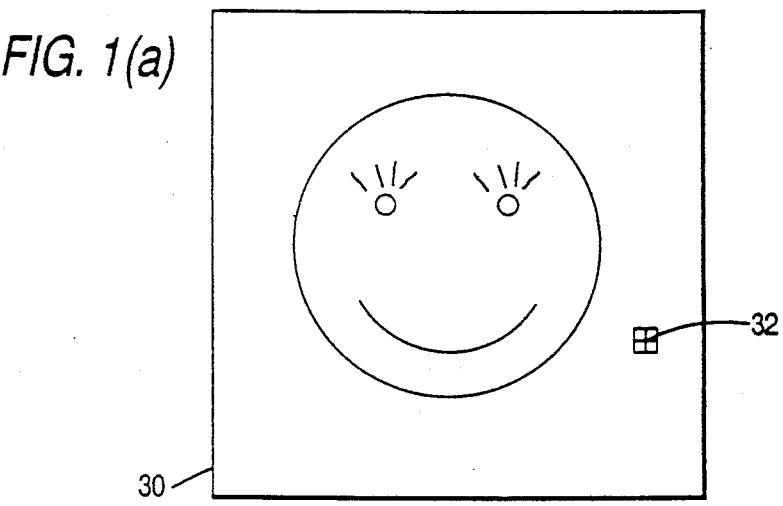
FIGS. 1(a)-1(c) show a digitized black and white image and the process of dividing the image into domain blocks.

Before describing the preferred embodiment of the invention, background information and discussion will be provided of the nature of the invention in relation to both image compression and image representation.

Many images contain much redundant information. For example, an image of a natural scene may contain a meadow, trees, and sky. Once one knows what a particular blade of grass looks like, one has useful information about other blades. Thus, there are enormous amounts of redundant information in a meadow scene. The pine needles on a pine tree are by no means randomly placed in the image; they are organized by the underlying structure of the tree. The structures of the clouds are governed to a good approximation by briefly expressed equations of physics, such as the Navier-Stokes equations. These examples indicate that significant compression can be achieved of data representing images such as meadows, trees, and sky.

Thus, redundancy is an important factor in image compression and image representation of images such as natural scenes, portraits, computer graphics images which can be expressed in terms of repetition, after processes of affine transformation and contraction. As mentioned earlier, one pine needle in an image of a forest is more or less like any other pine needle in that image. A compressed image does not require description of each pine needle in that image; rather, a single pine needle is described and then its basic information is utilized via mathematical algorithms to reproduce other pine needles in the image in a natural manner. This might be likened to describing one letter in a page of text and then describing the other occurrences of that letter in terms of the first occurrence.

There are essentially two steps in digital image processing. The first involves the transformation of the image into another representation. This often involves data compression, but not necessarily. The second involves recreating the original image, which may involve decompression.

Referring now to the drawings, in which like elements are identified by like reference characters, preferred embodiments of the methods and apparatus of this invention will now be described in detail. First, a data compression method and apparatus in accordance with the invention will be described.

Figure 1B:
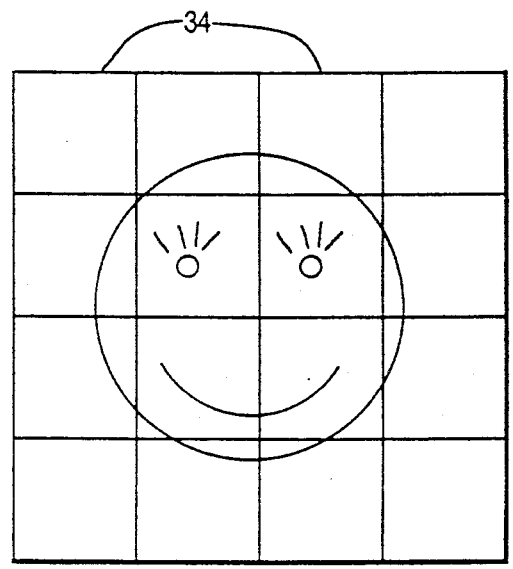
Figure 1C:
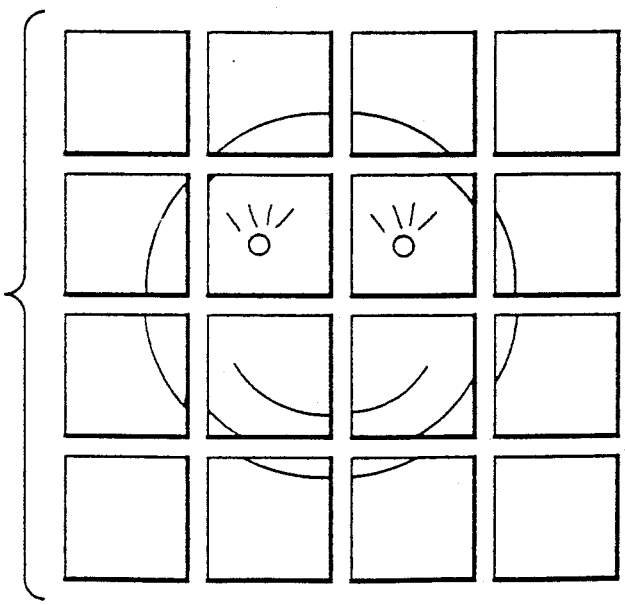

FIG. 1 shows a digitized black and white image 30 formed of a plurality of pixels 32. The image is stored as image data in a data processor, with one bit representing the image value (black or white) of each pixel. The preferred embodiment of the invention employs a plurality of uniquely addressable blocks 34, called domain blocks, which are generated from the stored image data. Each of the domain blocks represent a different portion of the image information such that all domain blocks together contain all of the stored image information.

Figure 2A:
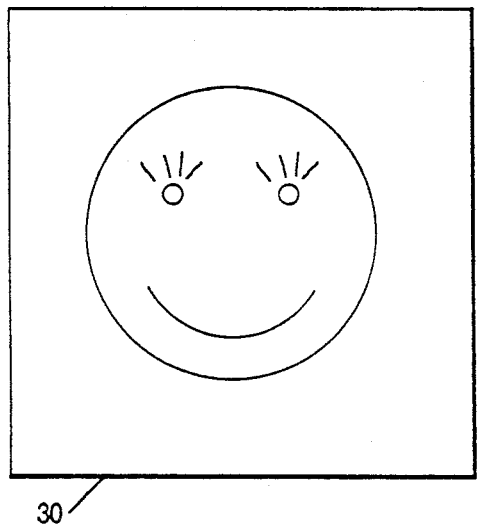
FIGS. 2(a)-2(c) show the process of dividing the image of FIG. 1 into range blocks.
Figure 2B:
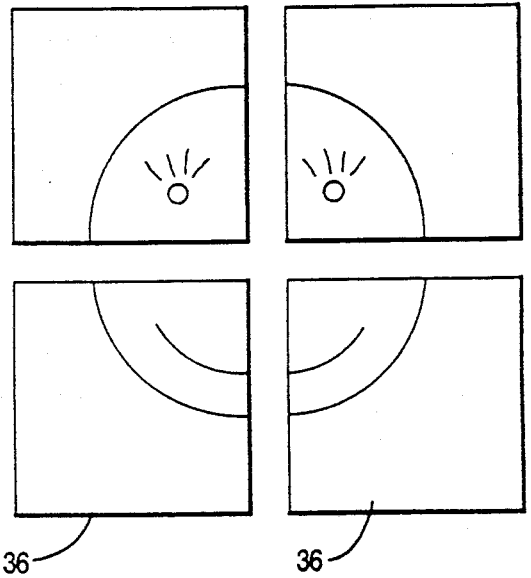
Figure 2C:
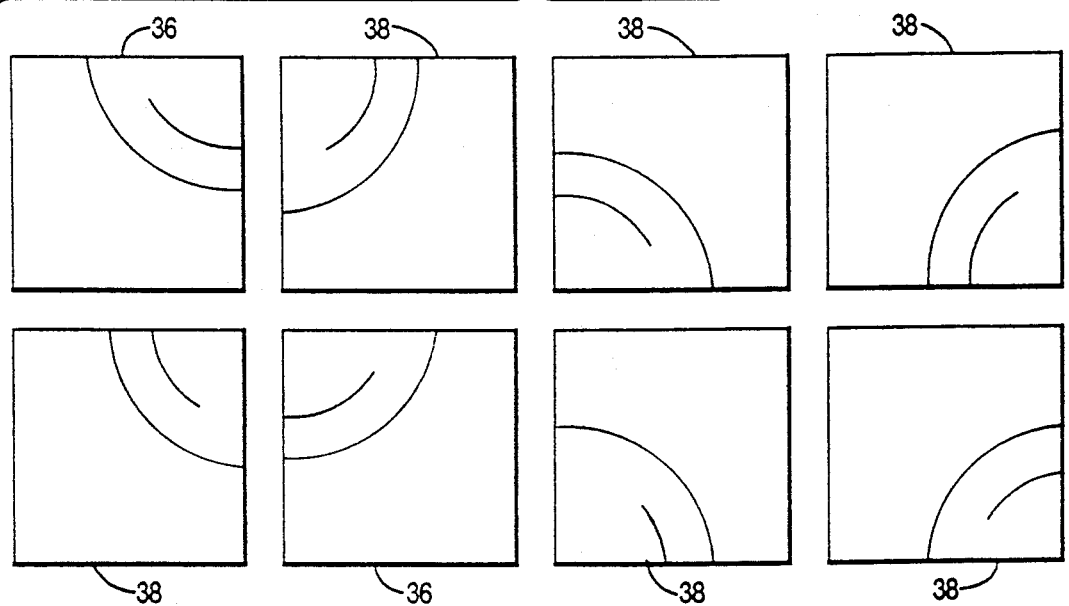
Figure 3A:
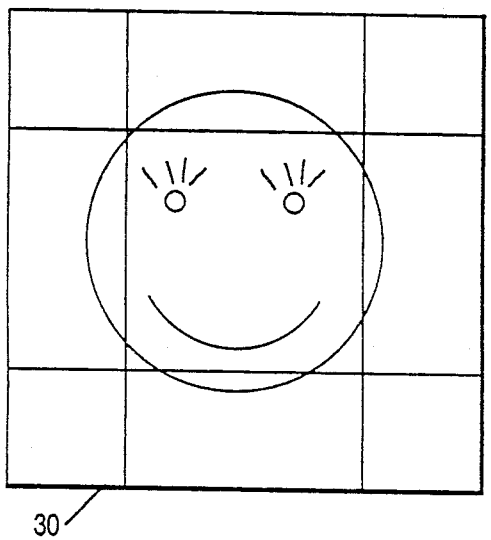
FIGS. 3(a)-3(b) show the process of a shifted decomposition of the image of FIG. 1 for the purpose of forming additional range blocks.
Figure 3B:
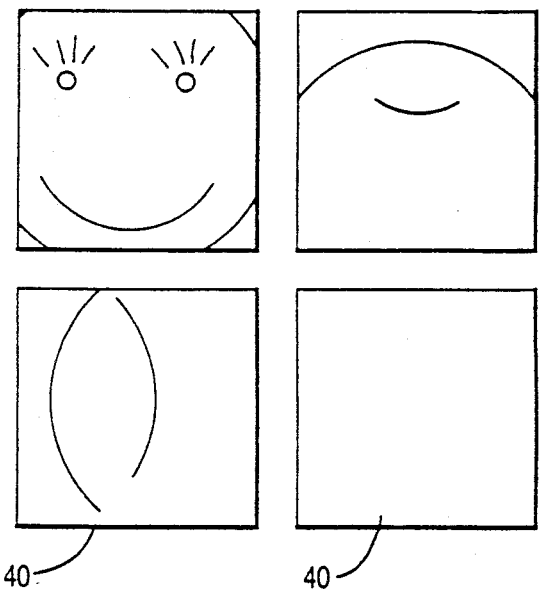

The stored image data are also used, in the preferred embodiment, to create a plurality of uniquely addressable mapped range blocks. Each mapped range block corresponds to a different subset of the image data, with each of the subsets having a unique address with respect to the image data. Preferably, the range blocks have a greater number of pixels than the domain blocks, and are created by executing, for each of the mapped range blocks, a corresponding procedure upon the subset of the image data which corresponds to that mapped range block. The procedure can include such processes as shrinking, rotating, cropping, and inverting. For example, in the preferred embodiment, the image 30 is broken up into range blocks 36, as shown in FIG. 2, and rotated and inverted to produce additional range blocks 38. Further range blocks 40 may be produced by selecting other subsets of the input digitized image 30, as shown in FIG. 3.

Figure 4A:
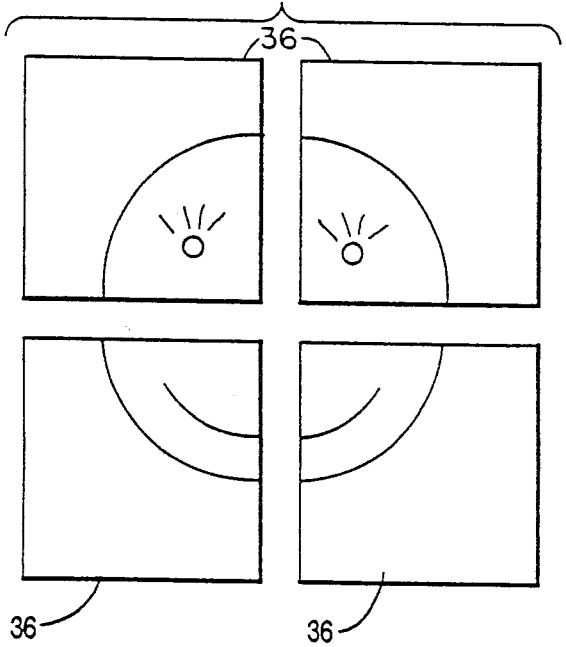
FIGS. 4(a)-4(b) show the process of producing shrunken range blocks from the range blocks of FIGS. 2 and 3.
Figure 4B:
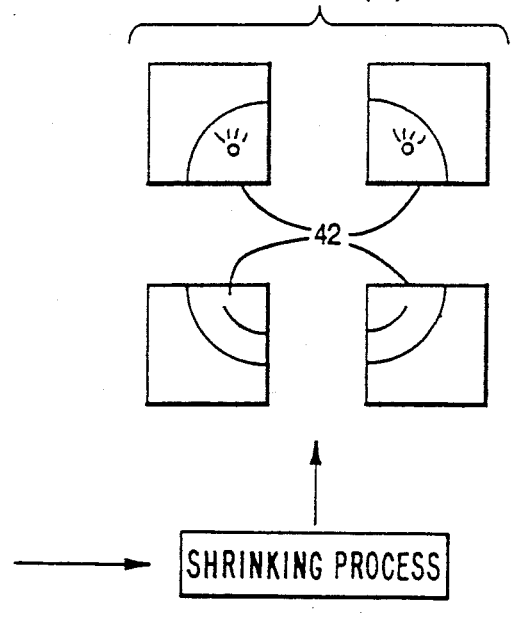

A shrinking process, illustrated in FIG. 4, is preferably applied to the range blocks 36, 38, and 40 to produce shrunken range blocks 42. The shrinking process ensures that the shrunken range blocks 42 contain the same number of pixels as the domain blocks 34.

Formation of Fractal Transform

Figure 5:
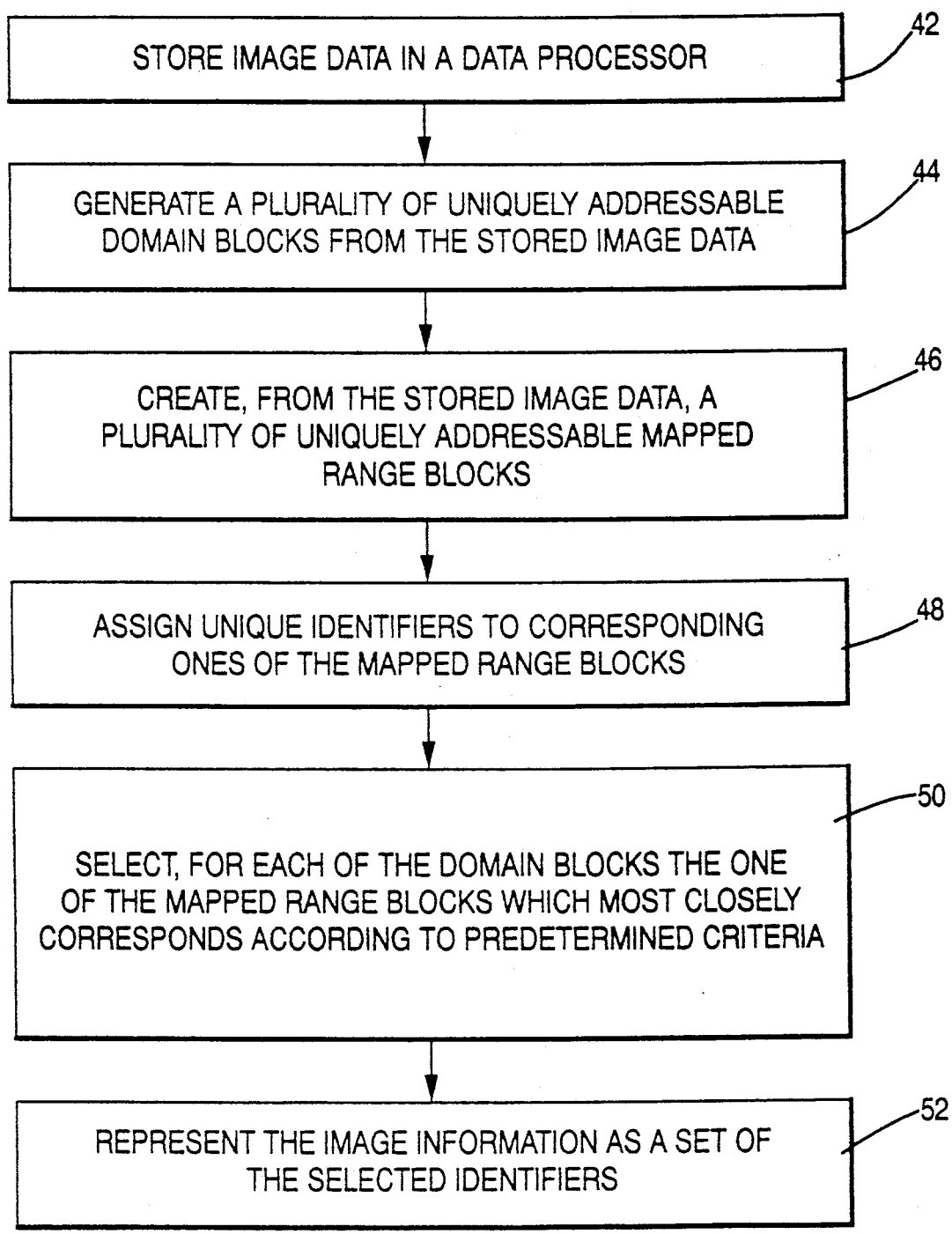
FIG. 5 is a logic flow chart of method for automatically processing digital image data which constitutes a preferred embodiment of the invention.

The concepts of domain blocks and range blocks will be useful in understanding the principles of the present invention which, in one aspect, provides a method, performed in a data processor, for processing digital image data consisting of image information, as shown in FIG. 5. First at step 42, image data is stored in a data processor. Step 44 of FIG. 5 comprises generating a plurality of uniquely addressable domain blocks from the stored image data, each of the domain blocks representing a different portion of the image information such that all of the stored image information is contained in at least one of the domain blocks. Step 46 comprises creating, from the stored image data, a plurality of uniquely addressable mapped range blocks corresponding to different subsets of the image data with each of the subsets having a unique address, the creating step preferably including the substep of executing, for each of the mapped range blocks, a corresponding procedure upon the one of the subsets of the image data which corresponds to the mapped range block. Step 48 comprises assigning unique identifiers to corresponding ones of the mapped range blocks, each of the identifiers specifying for the corresponding range block a procedure and an address of the corresponding subset of image data. Next, step 50 comprises selecting, for each of the domain blocks, the one of the mapped range blocks which most closely corresponds according to predetermined criteria. Finally, step 52 comprises representing the image information as a set of the selected identifiers.

Figure 6:
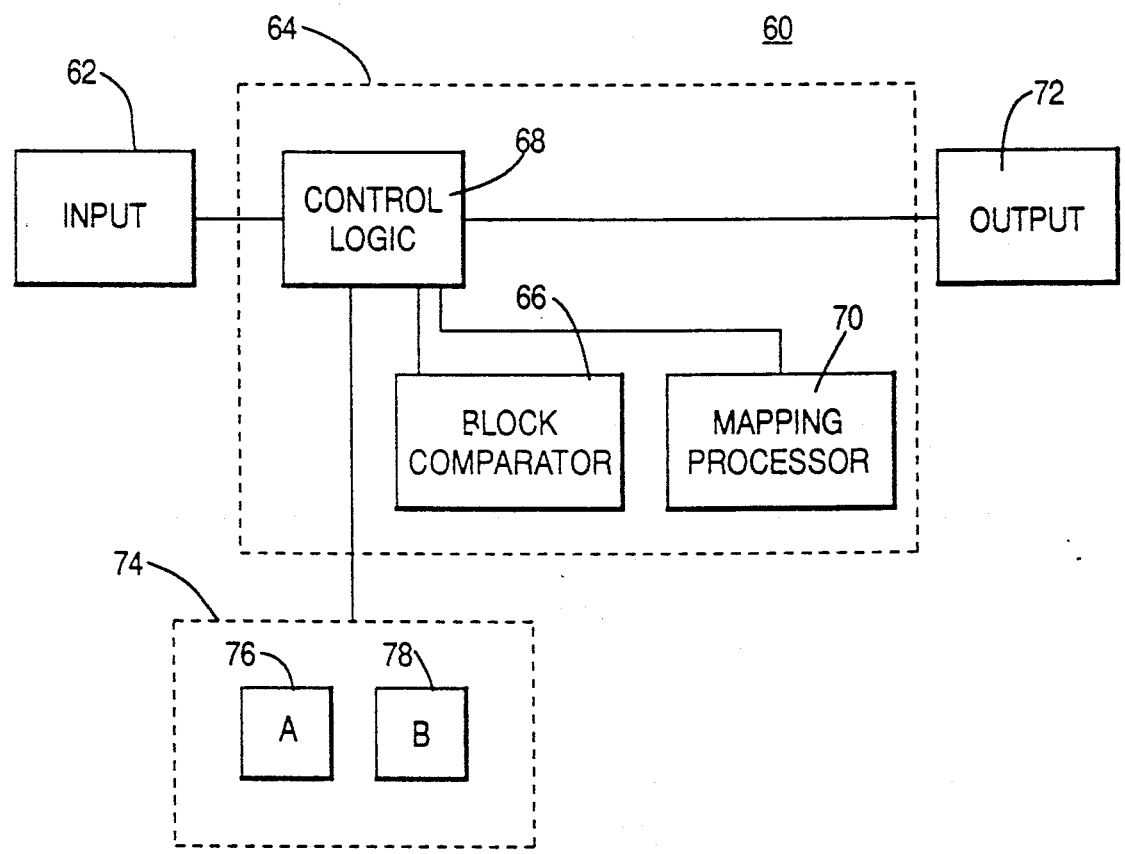
FIG. 6 is a block diagram of a data processor for performing the method shown in FIG. 5.

A block diagram of a suitable data processor 60 is shown in FIG. 6. Data processor 60 includes an input device 62, such as an image scanner. Input device 62 is connected to a central processor unit 64. Central processor unit (CPU) 64 includes a block comparator 66, control logic 68, and a mapping processor 70. CPU 64 is connected to an output device 72, such as a data transmitter or disk drive, and to a memory device 74. The image data is stored in memory device 74. Memory device 74 includes a pair of buffers 76, 78. Buffer 76 is used to store a plurality of domain blocks 34, and buffer 78 is used to store range blocks 36,38,40 and shrunken range blocks 42.

Control logic 68 of CPU 64 executes programs stored in memory 74 to initiate block comparison and mapping functions in mapping processor 70, respectively.

In the preferred embodiment, the image data received from input device 62 is formed by control logic 68 into an array of digital data of a predetermined size, such as, for example, 256×256 pixels and, corresponding to step 42 of FIG. 5, is stored into memory 74. According to step 44, the array is then formed into an array of domain blocks 34 each including, for example, sixteen pixels arranged into four rows and four columns.

According to step 46, the stored image data is formed into range blocks 36 containing a larger number of pixels than the number of pixels in domain blocks 34. These range blocks are then given unique addresses with respect to the stored image data, corresponding to step 48. In the preferred embodiment, such addresses consist of the x,y coordinates of the lower left pixel of the range block with respect to the array of the entire stored image data. For example, if the image data is stored as an array of pixels two hundred fifty-six pixels wide and two hundred fifty-six pixels high and is formed into four range blocks, the range block in the lower left of the array is assigned an address of 0,0. Similarly, the range block in the upper left of the array is assigned an address of 0,128, the lower right range block is assigned an address of 128,0, and the upper right range block is assigned an address of 128,128.

Additional range blocks 38 are also created in the preferred embodiment by processing the range blocks with local affine transforms such as rotation by 90°, 180°, and 270°, and inversion. In addition to shrunken range blocks 42, an escape block 95 (FIG. 9) is provided which is the same size as the shrunken range blocks, but which has no content (i.e., there is no picture drawn on it).

Figure 7:
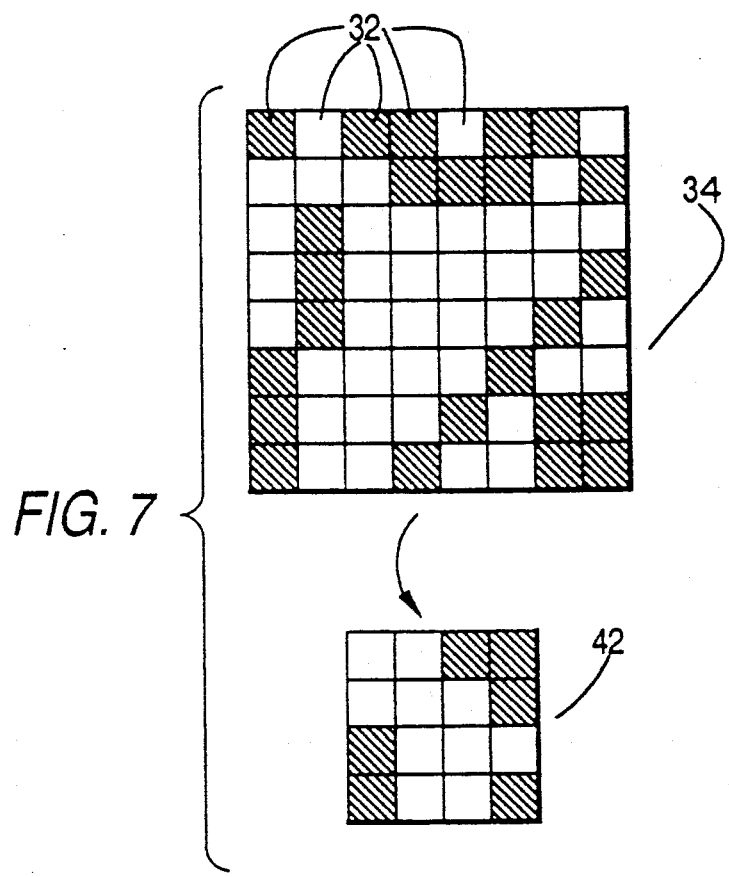
FIGS. 7 and 8 show in greater detail the process of generating shrunken range blocks.

The method for producing shrunken range blocks will now be described in greater detail, with reference to FIGS. 7 and 8. FIG. 7 illustrates a first embodiment of a method for producing a shrunken range block. As can be seen in FIG. 7, a range block 36 includes a plurality of black and white pixels 32. In the method shown in FIG. 7, known as a direct shrinking method, shrunken range block 42 is the output of the method and range block 36 is the input. Shrunken range block 42 is obtained from range block 36 by the following mathematical operation:

output (i,j) = input (2i, 2j)

where i and j respectively represent x and y positions of pixels, shown in FIG. 7.

Figure 8:
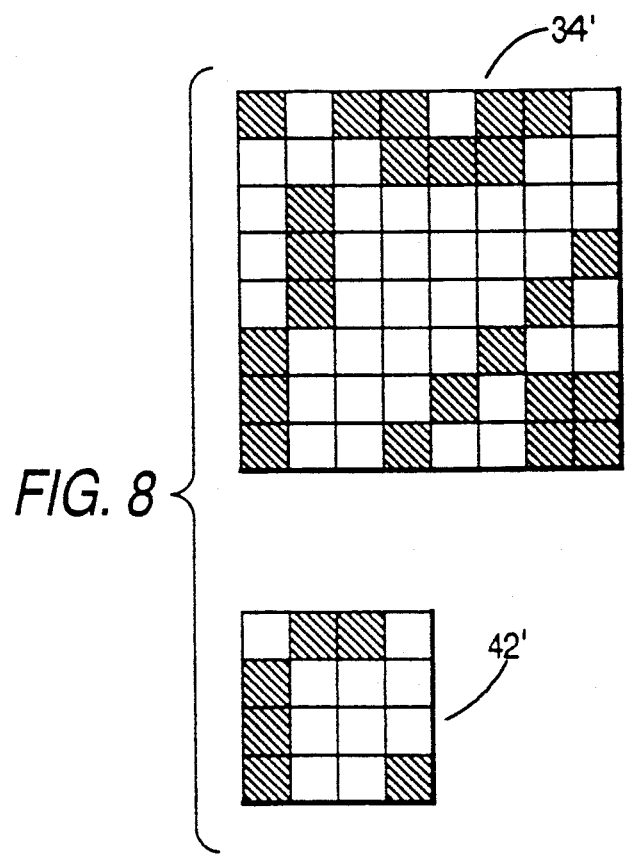

Similarly, FIG. 8 illustrates a shrinking by averaging method, in which shrunken range block 42' is obtained as output from the method when range block 36 is supplied as input. Specifically, the shrinking by averaging method may be expressed mathematically as:

output(i,j) = f(input(2i,2j) + input(2i+1,2j) + input(2i,2j+1) + input(2i+1,2j+1))

where $f(0)=0$; $f(1)=0$; and $f(2)=f(3)=f(4)=1$.

Unique identifiers are then assigned to the mapped range blocks. Each of the identifiers specify both the address of the subset of image data from which the corresponding range block was created and the procedure which was applied to the mapped range block. In the preferred embodiment, each of shrunken range blocks 42 and the escape block 95 are assigned an identifier. The escape block has a unique identifier. Shrunken range block identifiers include an address and an indication of affine transformations which have been applied to the range block from which the shrunken range block was derived.

In the preferred embodiment, each range block 36 consists of a quadrant of the 256×256 array which constitutes the stored image data. The address of the identifier, as specified above, is the x,y coordinate in the stored image array of the pixel in the lower left corner of range block from which the corresponding shrunken range block was derived. The identifier, in the preferred embodiment, also includes a first code indicating a 0°, 90°, 180°, or 270° rotation, and a second code indicating whether inversion has been performed to produce a range block prior to shrinking. It can be seen that the procedure specification includes the case where no rotation or inversion is applied prior to shrinking.

Next, corresponding to step 50 of FIG. 5, the mapped range blocks are compared to the domain blocks. For each domain block, one of the mapped range blocks is selected which most closely corresponds, according to predetermined criteria, to that domain block.

In the preferred embodiment, each domain block 34 is associated with either a single shrunken range block, or the escape block. This is achieved by means of block comparator 66 (FIG. 9), which selects, from the shrunken range blocks 42 and the escape block 95, the one which is "closest" to the domain block, i.e. most similar to the domain block.

Figure 9:
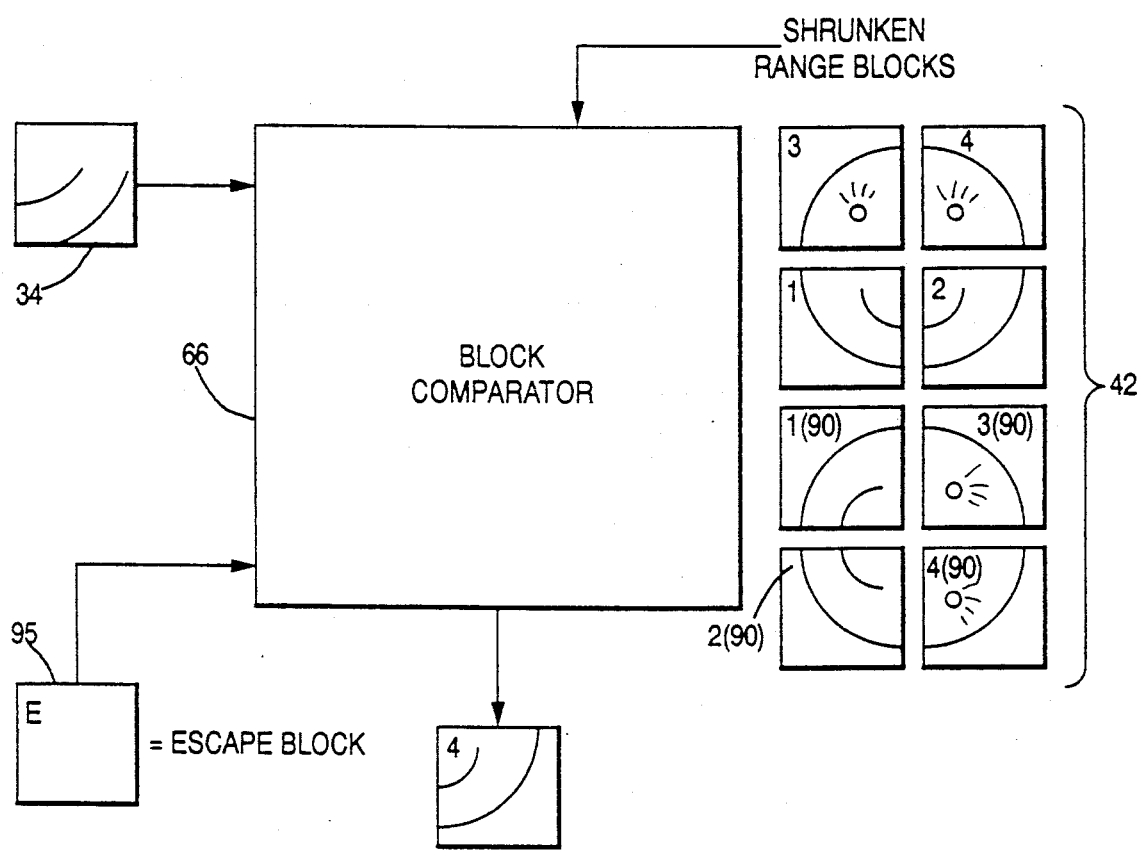
FIG. 9 shows the process of selecting the shrunken range blocks which most closely resembles a domain block.

Although addresses of range blocks in the preferred embodiment are x,y pixel coordinates, for purposes of explanation the range block addresses will be expressed as quadrant numbers 1-4, as shown in FIG. 9. Similarly, rotation in FIG. 9 will be expressed as degrees, rather than as a code. In the example shown in FIG. 9, shrunken range block #2 is the closest shrunken range block to input domain block 34. In a similar manner, each domain block of image 30 is processed by block comparator 66 to select the closest shrunken range block 42 (or escape block 95).

Block comparator 66 of FIG. 9 will now be described in greater detail. The purpose of block comparator 66 is to determine, for each domain block, which of the shrunken range blocks is most similar in appearance the specified domain block. That is, which of the shrunken range blocks is "closest" to the domain block. This alternative statement implies an analogy which is useful in understanding the concept of comparisons between blocks of image data. That concept is referred to as "distance." In order to evaluate "distance" between blocks, consider the concept of distance between points in space. If two points A and B are present in a two-dimensional coordinate system, their positions within the coordinate system may be represented by $x_A, y_A$ and $x_B, y_B$, respectively. The distance between the points is thus $\sqrt{(x_A-x_B)^2+(y_A-y_B)^2}$. This procedure yields the distance between points A and B "as the crow flies", and is referred to as the Euclidean distance.

Another way of thinking about the distance between points A and B mentioned above is to consider that such points represent locations in a large city made up of a matrix of perpendicular streets. The distance between points A and B could then be determined "as the taxi drives" rather than "as the crow flies", and is represented as $(|x_A-y_B|)+(|y_A-y_B|)$. Such distance has been termed the "Manhattan" distance.

From the concept of distance between two points, consider the concept of distance between a single point and a set of a plurality of other points. Using any convenient concept of distance, such as the Euclidean or Manhattan distance discussed above, the distance between a point and a set may be thought of as the sum of the distances from the point to each individual point within the set.

Using the concept of distance from a point to a set, the distance between two sets of points may be considered. A very general description of the distance between two sets is a "sum of a sum." That is, a first point of the first set is selected. The distance between this point and each point in the second set is calculated. Next, a second point is selected from the first set. The distance between this second point and each point of the second set is then calculated and added to the first set. In a similar manner, distances between each succeeding point of the first set and all of the points of the second set are calculated and summed to yield the distance between the two sets of points.

The concept of distances between two sets is employed in calculating a distance between two groups of image data, for the purpose of selecting, from a group of shrunken range blocks, the shrunken range block which is most similar to a domain block. In particular, the preferred embodiment makes use of a mathematical concept known as the Hausdorff distance. This concept is well known in the art and is discussed, for example, in *Fractals Everywhere* by Michael F. Barnsley.

The Hausdorff distance H between two blocks of image data f and g can be expressed as H (block f, block g). In the preferred embodiment, block comparator 66 calculates the quantity H between a domain block and each of the shrunken range blocks. The shrunken range block which yields the lowest value of H is selected as the "closest" shrunken range block to the specified domain block.

This concept may be more readily appreciated by reference to FIG. 10, in which columns (a) and (b) respectively show two blocks of black and white image data, namely, block f and block g. Block f consists of a cross of black pixels plus an additional black pixel in the upper right hand corner. Block g consists of a square formed of a block of sixteen black pixels. Directly below the image blocks f and g in FIG. 10 are binary representations of the image data contained in blocks f and g. Specifically, the binary representation of blocks f and g consists of a matrix of zeros (0's) and ones (1's), with 0's representing a white pixel and 1's representing a black pixel.

Directly below each binary block f and g is a distance table for the respective binary block. The distance table consists of a matrix of numbers each corresponding to one of the pixels in the blocks f and g. The number in each position of the distance tables for image blocks f and g represent the number of pixels between the pixel corresponding to that position and the closest position corresponding to a black pixel (or in the binary block, a 1). For example, the upper left hand entry of distance table f in FIG. 10 is a 4. This represents the fact that moving only in horizontal and vertical directions, not diagonal, (the Manhattan distance concept), there are four pixels between the upper left hand pixel of image block f and the closest black pixel. This can be seen by beginning at the upper left hand pixel, counting over three pixels to the right and down one pixel.

The entry immediately to the right of the left hand entry of the distance table for block f is the number 3. This indicates the fact that starting from the pixel just to the right of the upper left hand pixel of block f, there are three pixels between the specified pixel and the closest black pixel. This can be seen by counting over two pixels to the right and down one pixel. In a similar manner, each entry of the distance table for image block f is determined. Also, a distance table is computed in the same way for image block g.

The lowest blocks of FIG. 10 represent the distance table f intersected by binary block g, and the distance table g intersected by binary block f. A value D is computed equal to the sum of the numbers of the two intersection figures. As can be determined from FIG. 10, the sum of the numbers of the distance table f intersected by binary block g is 25 and the sum of the numbers of distance table g intersected by binary block f is 8, yielding a value D equal to 33. A modified Hausdorff distance H for image blocks f and g can be expressed as follows:

H (block f, block g) = D (block f, block g) + D (1-block f, 1-block g).

The term "1-block f" is the inverse of image block f, and thus is an image block in which each pixel is the opposite of a corresponding pixel of block f.

Block comparator 66 (FIG. 9) calculates quantity H between a selected domain block and each shrunken range block, and chooses as the selected shrunken range block, that shrunken range block which yields the lowest value of H.

Alternative embodiments are, of course, possible. For example, a modified Hausdorff distance between blocks could be calculated, using the concept of Euclidean distance rather than Manhattan distance. Similarly, block comparator 66 could employ distance measuring concepts other than the Hausdorff distance to select a shrunken range block which is most similar to each domain block.

Once the selection of mapped range blocks is completed, the image information is then represented as a set of the unique identifiers corresponding to the selected mapped range blocks, corresponding to step 52 of FIG. 5. The list of identifiers of the selected range shrunken range blocks 42, (including both addresses and local affine transform procedures, such as rotation, reflection, or inversion, to be performed on the data specified by the address) constitutes the "fractal transform" 98 of image 30, as shown in FIG. 11. Each domain block 34 of image 30 is represented by an address 99 of a shrunken range block. For example, the domain block in the upper left corner of image 30 may be closest to shrunken range block #3. The domain block immediately to the right of the upper left domain block may be closest to shrunken range block #5 rotated 90°. The next domain block to the immediate right may be closest to the Escape block 95. In such example, the first three addresses fractal transform 98 would be 3, 5(90), E, as shown in FIG. 11. The set of identifiers can thus be stored, transmitted, or analyzed.

Figure 12:
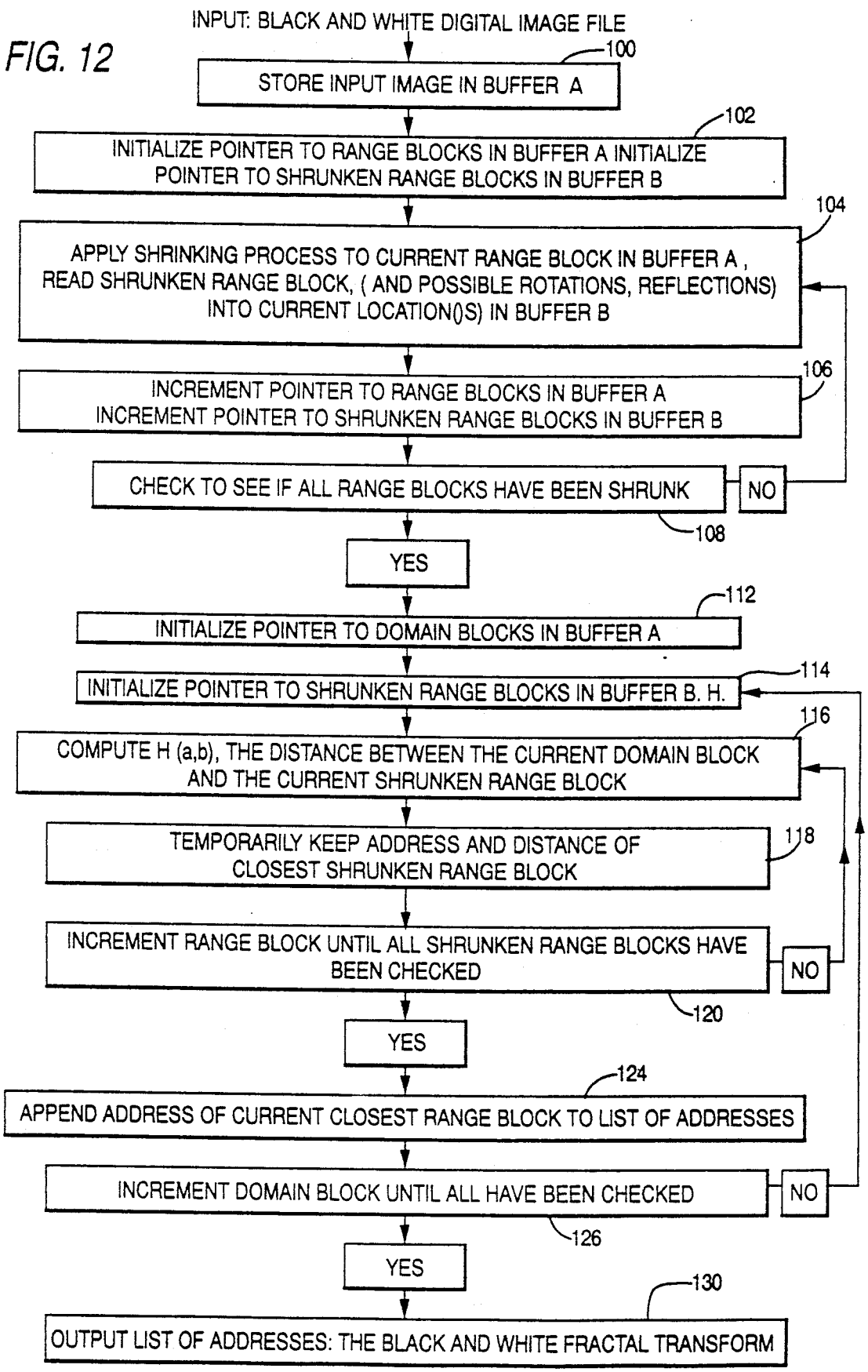
FIG. 12 is a logic flow chart showing a method for automatically creating a fractal transform representative of black and white image data.

FIG. 12 shows in detail a preferred embodiment of a method of automatically creating a fractal transform representative of black and white image data according to this invention. At step 100, digital image data is stored in buffer A of a data processor. Preferably that image data consists of binary information representing a black and white image. A range block size should be preselected so that when the input image is stored in buffer A, range blocks are automatically assigned to the different digital image data in buffer A.

At step 102, range block pointers for buffer A and shrunken range block pointers for buffer B are initialized. The size of the input image data array and the sizes of both the range blocks and the shrunken range blocks are predetermined values. Therefore, these pointers, consisting of x,y coordinates in buffers A and B, can be determined.

At step 104, a shrinking process is applied to the range block in buffer A specified by the range block pointer. In certain applications, local affine transforms, such as rotation, reflection, or inversion, may be applied to the range block prior to shrinking to obtain a greater number of shrunken range blocks for a given input image. The shrunken range blocks are then read into the locations in buffer B identified by the shrunken range block pointers.

The range block pointers for buffer A and the shrunken range block pointers for buffer B are then incremented at step 106. A determination is made at step 108 to see whether all of the range blocks in buffer A have been shrunk. If not, steps 104 and 106 are repeatedly executed until all range blocks in buffer A have been shrunk.

Next a domain block pointer in buffer A is initialized (step 112) and the shrunken range block pointer in buffer B is initialized (step 114). At step 116, the Hausdorff distance between the domain block specified by the domain block pointer and the current shrunken range block specified by the shrunken range block pointer is determined.

If the Hausdorff distance just computed is less than the currently stored distance value (which is initialized to the largest possible Hausdorff distance), then at step 118 the currently stored distance value is replaced by the distance value most recently computed. The current shrunken range block pointer value is also stored. If the most recently computed Hausdorff distance is not less than the currently stored distance value, the most recently computed distance value is discarded.

At step 120, the shrunken range block pointer is incremented and a determination is made whether all of the shrunken range blocks have been checked. If not, steps 116 and 118 are repeated until all shrunken range blocks have been checked. If so, the currently stored shrunken range block pointer, consisting of x,y coordinates, and the associated procedure information (reflection and inversion), is then appended to the list of identifiers representing the domain blocks of the input image data stored in buffer A (step 124).

Next, the domain block pointer is incremented at step 126 and a determination made whether all domain blocks have been processed. If not, steps 116-126 are repeatedly executed until all domain blocks have been processed. The list of identifiers, each corresponding to one of the domain blocks of the original input data, is then output at step 130 as the fractal transform of image data representing the black and white image supplied as input to the data processor.

In the preferred embodiment, the identifiers of the shrunken range blocks are expressed as follows.

XYrri where:

X is an right bit value representing the x-coordinate of the lower left corner of the range block in the original image array;

Y is an eight bit value representing the y-coordinate of the lower left corner of the range block in the original image array;

rr is a two-bit value representing rotation as follows:
00 = no rotation
01 = 90° rotation
10 = 180° rotation, and
11 = 270° rotation;

i is a one-bit value representing inversion as follows:
0 = no inversion, and
1 = n = inversion.

REGENERATION OF IMAGES FROM FRACTAL TRANSFORM

Figure 13:
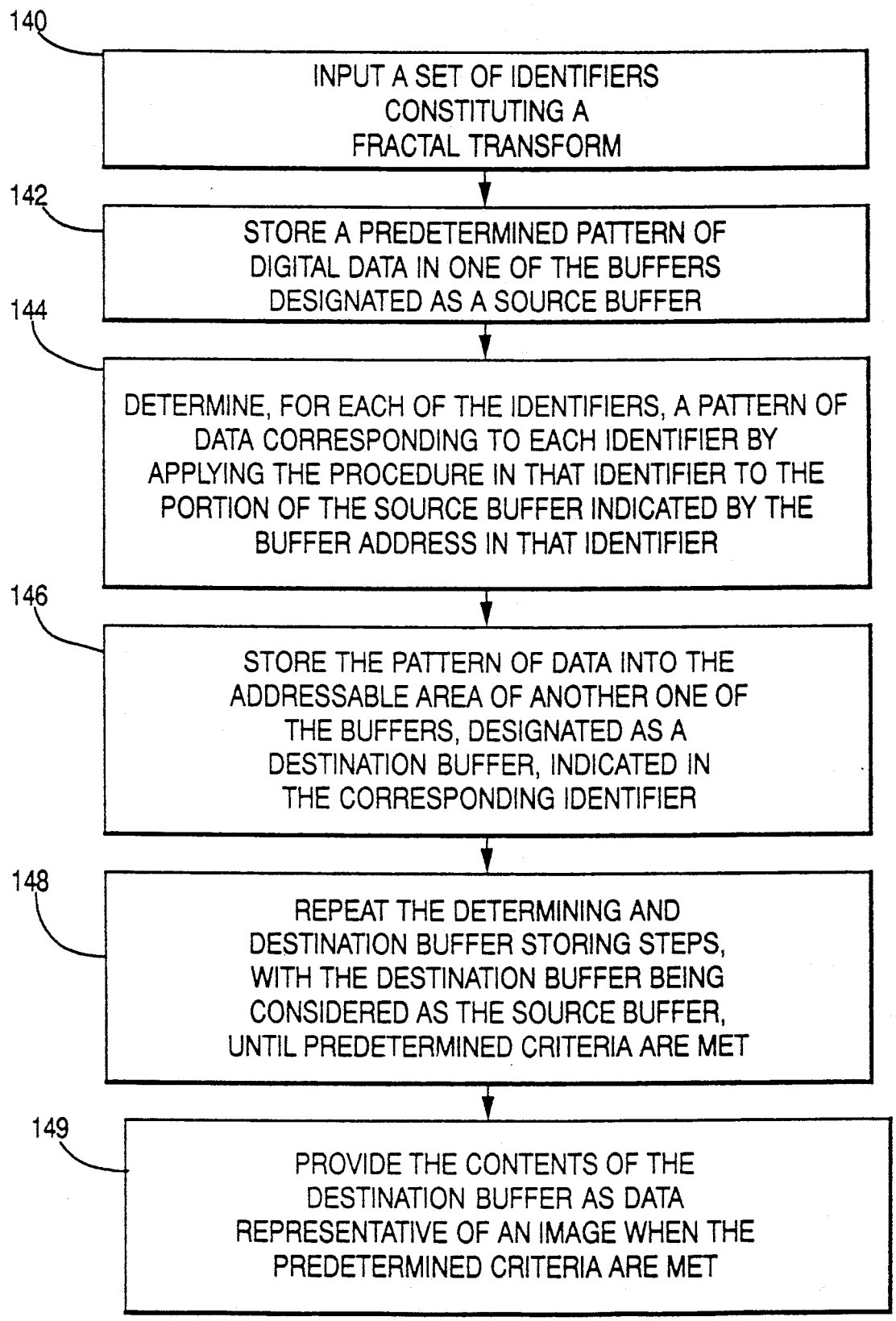
FIG. 13 is a logic flow diagram of a method for automatically generating an image by a data processor from a set of identifiers consisting of the fractal transform produced by the method of FIG. 12.

In another aspect, the present invention provides a method for generating an image by a data processor from a compressed data set consisting of a set of identifiers. The data processor includes a memory having a plurality of buffers each having a plurality of addressable areas specified by a buffer address. Each of the identifiers corresponds to an addressable area in the buffers and includes a buffer address and a procedure specification. As shown in FIG. 13, the method includes a first step 140 comprising inputting the set of identifiers. Step 142 comprises storing a predetermined pattern of digital data in one of the buffers designated as a source buffer. Step 144 comprises determining, for each of the identifiers, a pattern of data corresponding to each identifier by applying the procedure specified in that identifier to the portion of the source buffer indicated by the buffer address in that identifier. Next, a step 146 comprises storing the pattern of data into the addressable area of another one of the buffers, designated as a destination buffer, indicated in the corresponding identifier. A step 148 comprises repeating the determining and destination buffer storing steps, with the destination buffer being considered as the source buffer, until predetermined criteria are met. Finally, a step 149 comprises providing the contents of the destination buffer as data representative of an image when the predetermined criteria are met.

Figure 14:
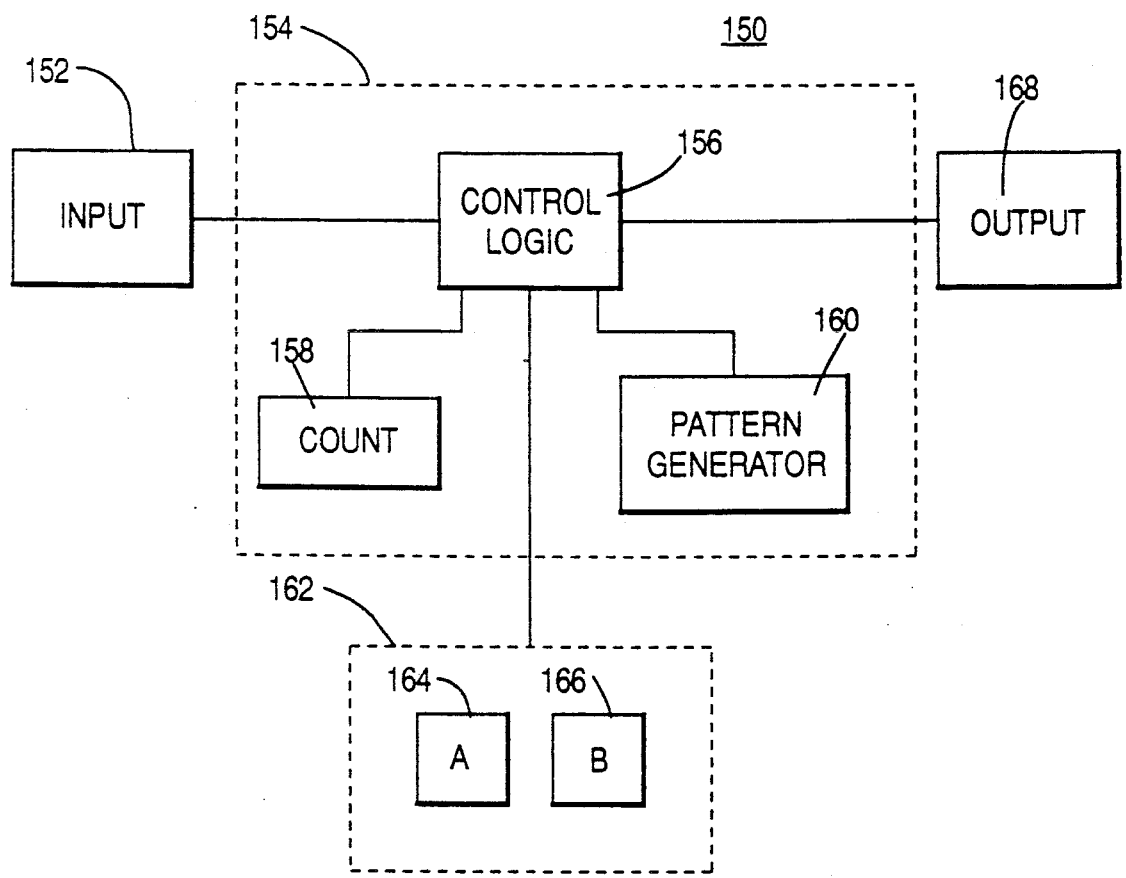
FIG. 14 is a block diagram of a preferred embodiment of apparatus for decoding a fractal transform.

FIG. 14 shows a data processor 150 for executing the method of FIG. 13. Data processor 150 includes an input device 152 such as a data receiver or a disk drive. Input device 152 is connected to a CPU 154 which includes control logic 156, a counter 158, and a pattern generator 160. A memory device 162 is connected to CPU 154 and includes a pair of buffers 164 and 166. An output device 168 is also connected to CPU 154 and may comprise a CRT display device.

Figure 15:
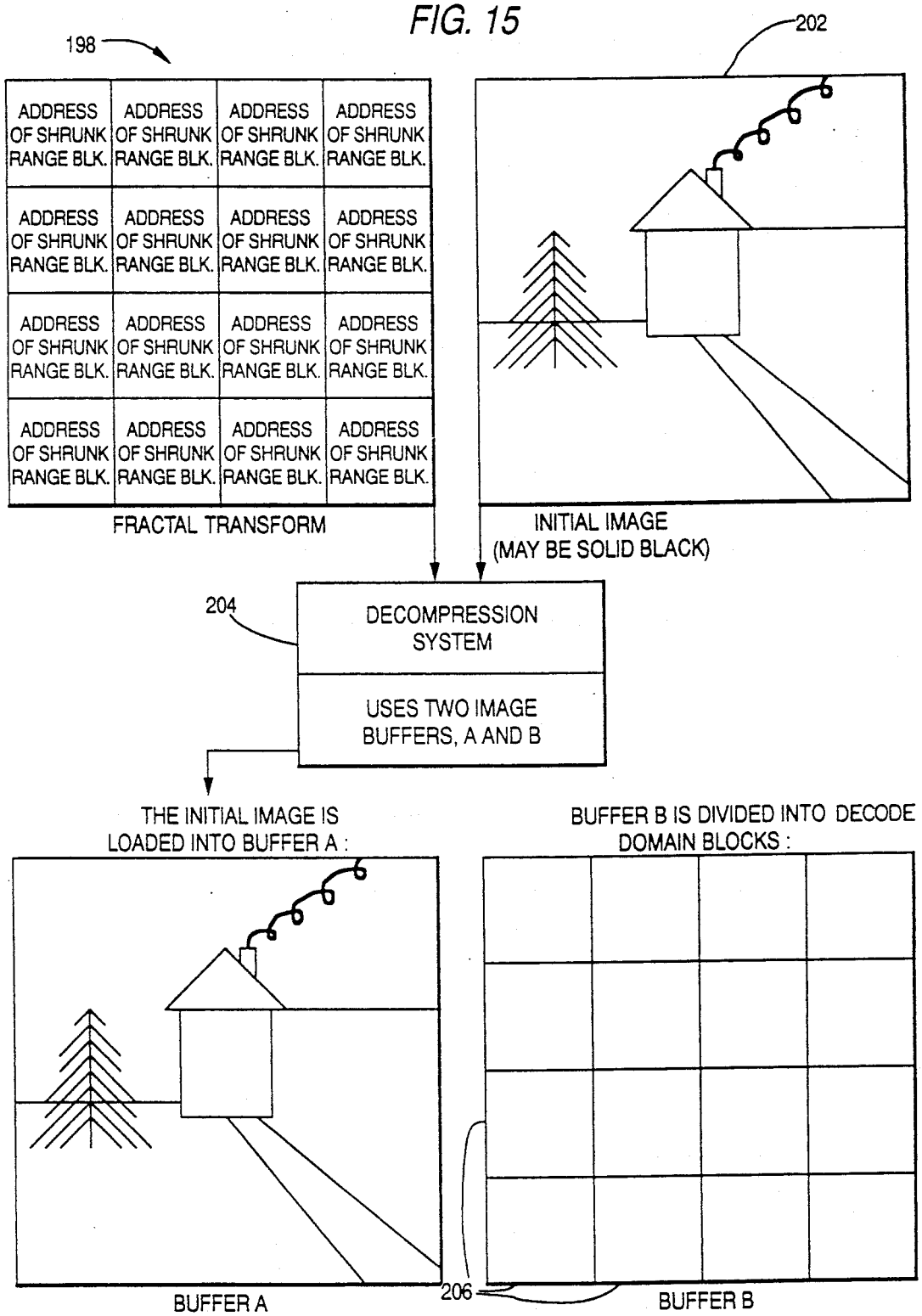
FIG. 15 shows a decompression system which is used to decode the fractal transform of FIG. 11.

FIG. 15 illustrates a system for carrying out a preferred method of the invention for recovering the image from fractal transform 98. First, a predetermined pattern of digital data is stored in one of the buffers designated as a source buffer. As shown in FIG. 15, digital data representative of an initial image 202 and fractal transform 198 are input to a decompression system 204, which preferably comprises data processor 150. Initial image 202 is loaded into a buffer A, designated the source buffer.

Decompression system 204 then determines, for each of the identifiers, a corresponding pattern of data. The corresponding pattern is determined by applying the procedure specified by that identifier to the portion of the source buffer indicated by the identifier's buffer address. Decompression system 204 then stores the resulting pattern into a corresponding addressable area of another one of the buffers, buffer B, designated as a destination buffer.

Figure 16:
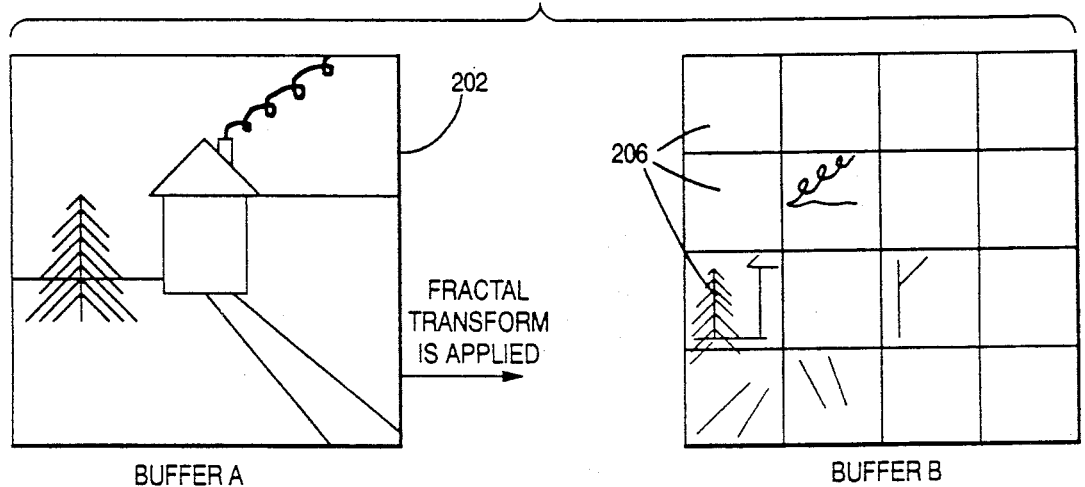
FIG. 16 shows the process of applying the fractal transform of FIG. 11 to an image in buffer A of FIG. 15 to obtain an image in a buffer B.

This procedure is demonstrated in FIG. 16. In that Figure, a buffer A acts as a source buffer and is filled with data representative of initial image 202. A buffer B acts as a destination buffer and is partitioned into decode domain blocks 206. Each of the decode domain blocks 206 corresponds to one identifier of input fractal transform 198. In determining the pattern of data to be stored into each decode domain block, 206 the corresponding identifier of the domain block is used. As described above, each identifier in fractal transform 198 consists of an address and a procedure specification. The address represents a range block derived from a specified portion (for example, the lower left quadrant) of a set of data representative of an input image. In the decompression process, the address of the identifier corresponding to a decode domain block 206 is used to specify the same portion, e.g. the lower left quadrant, of the data set stored in the source buffer, buffer A of FIG. 16, which represents initial image 202. This portion of the data stored in buffer A is then processed by the procedure specified by the identifier corresponding to the domain block and the processed data further processed by shrinking. The processed and shrunken data is then stored into a corresponding decode domain block in buffer B.

For example, if an identifier corresponding to a specified decode domain block 206 of buffer B consists of "1(90)", this represents an address and a procedure. The address indicates that range block #1 is involved, consisting of the lower left quadrant of an image. The procedure specifies rotation by 90°. Thus, to derive the digital data to be stored into the specified decode domain block, the data representing the lower left quadrant of the image in buffer A is operated on by a procedure to rotate the corresponding image by 90° and the data is then processed by a shrinking algorithm to obtain a shrunken range block in the manner discussed above with respect to the process of forming the fractal transform. The resultant data representing the shrunken range block is then stored into the specified decode domain block of buffer B.

In a similar manner, each of the decode domain blocks 206 is filled with data specified by the corresponding identifier of fractal transform 98. If the address of the corresponding identifier specifies the escape block, i.e., a block containing image data representing a blank image, an escape block is stored in the corresponding decode domain block.

Figure 17:
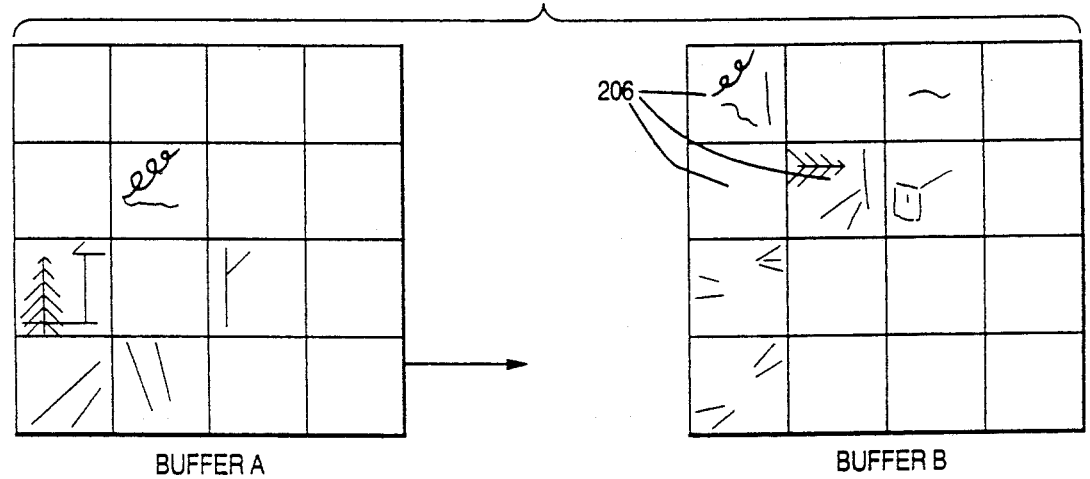
FIG. 17 shows a further stage in the process of FIG. 16.
Figure 18:
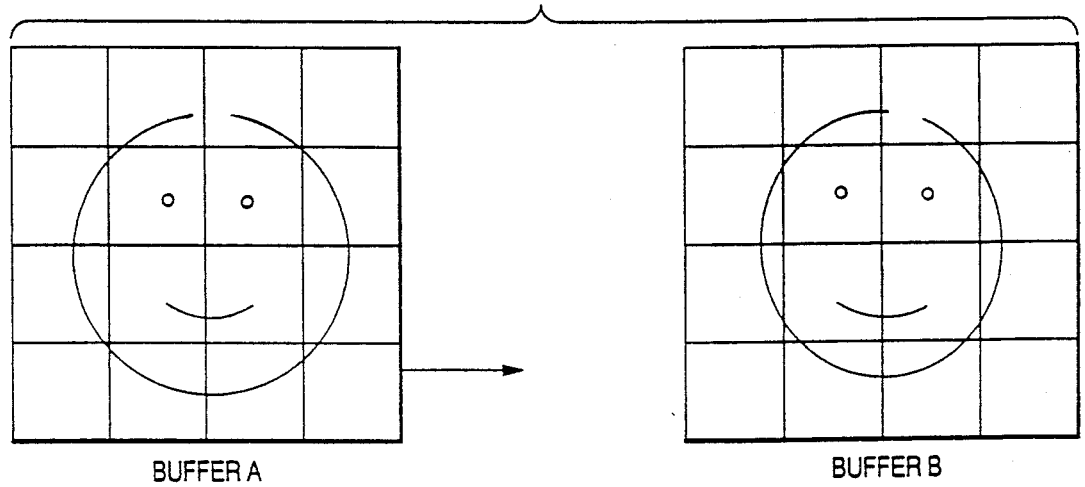
FIG. 18 shows the production of an output image from the decompression system of FIG. 15.

In the preferred embodiment of the invention, the preceding two steps of (1) filling buffer A with image data and (2) filling all decode domain blocks of buffer B with digital data representing shrunken range blocks of buffer A specified by the identifiers of the fractal transform, are repeated until predetermined criteria are met, as shown in FIG. 18. During this repetition, instead of filling buffer A with data representing the initial image 202, the image data in buffer B (FIG. 16) is read back into buffer A. This can be observed by noting that the content of buffer B of FIG. 16 is stored in buffer A of FIG. 17.

The method concludes with providing the contents of the destination buffer as data representative of an image when the predetermined criteria are met.

Thus, the steps of FIGS. 16 and 17 are repeated a certain number of times, until "convergence" is achieved. The number of iterations, as monitored by counter 158 (FIG. 14), depends on the dimensions (measured in pixels) of the domain blocks and range blocks and may consist of a fixed number of iterations. Alternatively, the iterations may be determined by measuring the difference between the image data in buffers A and B and terminating the iteration process when the difference is less than a predetermined value.

Figure 19:
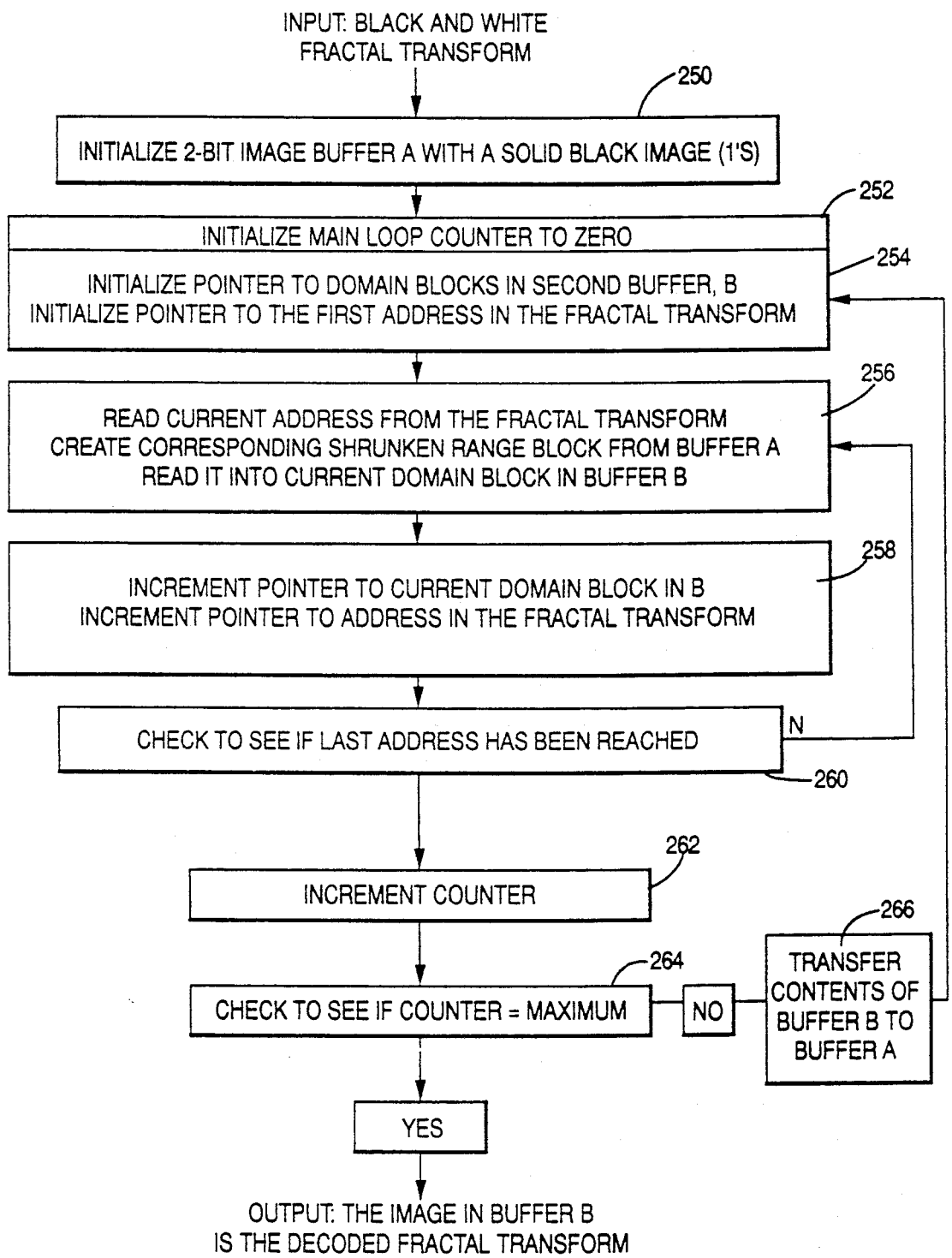
FIG. 19 is a logic flow diagram of a preferred embodiment of the method of FIG. 13.

FIG. 19 shows a detailed description of a preferred method for automatically generating an image by a data processor according to the present invention from a set of identifiers consisting of the fractal transform of an original image. The fractal transform could be generated from the method in FIG. 12 or any other method which can generate a set of identifiers such as produced by the method of FIG. 12.

At step 250, a buffer A, comprising an image buffer in the data processor, is initialized with initial image data representing a solid black image (i.e., all 1's). Any initial image could be used. However, all-black is a convenient and easily stored set of image data.

At step 252, a main loop counter (the functions of which may be provided by counter 158) is initialized to zero. The main loop counter indicates the numbers of times the image generation steps of FIGS. 16 and 17 have been repeated. This number may be compared to a predetermined value selected for the specific application, to end the iteration process.

At step 254 a domain block pointer is initialized for a second buffer, buffer B, which has been previously divided into domain blocks. Also at step 254, a fractal transform pointer is initialized to point to the first identifier of the fractal transform representing the input compressed image data.

At step 256, the identifier specified by the fractal transform pointer is applied to image data in buffer A. The address in that identifier specifies a range block in buffer A, and the process of that identifier is then applied to the specified range block. As noted previously, the identifier could also specify the escape block. Next, a shrunken range block is constructed from the processed, specified range block from buffer A and the shrunken range block (or the escape block) is read into a domain block in buffer B pointed to by the current value of the domain block pointer. The technique of obtaining a shrunken range block can use any of the shrinking techniques described above, or may use a different technique altogether.

At step 258, the domain block and fractal transform pointers are incremented. A determination is then made at step 260 whether the last identifier of the input fractal transform has been processed. If not, the method loops back to step 256.

If the last fractal transform identifier has been processed, the method advances to step 262 in which the main loop counter is incremented. A determination is made at block 264 whether the main loop counter has reached a maximum value. If not, the contents of buffer B are transferred to buffer A, as shown at step 266, and the method loops back to step 254. After a predetermined number of iterations of steps 254-266, the contents of buffer B are supplied as output data representing the original uncompressed image.

The method shown in FIG. 19 provides an iterative process in which the number of iterations are specified by a predetermined value. Alternatively, the iterations of the method shown in FIG. 19 could continue until the contents of buffer B only differ from the contents of buffer A by less than a predetermined amount. This method, known as the convergence method, may be further described as follows. After the step in which the contents of buffer B have been computed, the following steps are carried out:

i) initialize a and b, respectively consisting of a pointer to a domain block in buffer A and a pointer to a domain block in buffer B which has the same relative position in buffer B as the domain block in buffer A pointed to by a.

ii) initialize an integer register to zero.

iii) use a block comparator, such as comparator 66, to compute a distance between the domain block pointed to by a and the domain block pointed to by b.

iv) increment the register value by this distance.

v) increment pointers a and b.

vi) repeat steps (iii) and (iv) until all domain blocks have been processed.

vii) store the register value as a final register value.

viii) repeat steps (i)-(vii) each time the contents of buffer B are recomputed and compare the successive final register values.

ix) cease iterations shown in FIG. 19 when successive final register values differ by less than a predetermined threshold value.

As will be apparent to those of ordinary skill in the art, equivalent implementations of the present invention could be provided. For example, the original image can be generated from the compressed fractal transform by use of only a single image buffer, as shown in FIG. 20. FIG. 20 identifies the steps in an alternative embodiment of the invention for a method of generating an image by a data processor from a set of identifiers. The data processor includes a memory having an image buffer with a plurality of addressable areas specified by a buffer address. Each of the identifiers corresponds to an addressable area in the buffer and includes both a buffer address and a procedure to be applied to the data in the area identifier by the corresponding address. First a predetermined pattern of digital data for an arbitrary image is stored in the image buffer. This is indicated at step 300 in which image data representing an arbitrary input image is stored in an image buffer. The set of identifiers, comprising a fractal transform, is provided as input to a data processor as shown in block 304. For each addressable area of the image buffer, a pattern of data corresponding to that identifier is determined by applying the procedure in that identifier to the portion of the image buffer indicated by the buffer address of that identifier. That data pattern is then stored back into the same area of the image buffer indicated by the buffer address for the corresponding identifier.

As shown in FIG. 20, these steps are performed by setting a pointer to a first domain block in the image buffer (at step 306). Next, at step 308, the address of a range block corresponding to the image block specified by the pointer is read. A shrunken range block is then constructed from the image data in the image buffer, as indicated in block 310. Next, the data present in the domain block of the identifier is then replaced by the data from the shrunken range block, as indicated at step 312.

The steps of identifying and storing are then repeated until a predetermined criteria are met, and the contents of the image buffer are provided as data representative of an image. As shown in step 314, the domain block pointer is incremented and a determination made at step 316 whether all domain blocks have been processed. If not, steps 308, 310, and 312 are repeated until all domain blocks are processed. A determination is then made at step 318 whether the contents of the image buffer are stable, that is, differ by less than a predetermined amount from the previous contents. This determination may be made by performing steps (i)-(vii) of the convergence method described above. When the predetermined threshold value of the final register value is reached, the contents of the image buffer are then provided as output representative of the original compressed image, as indicated at step 320.

Grayscale Images

Figure 21A:
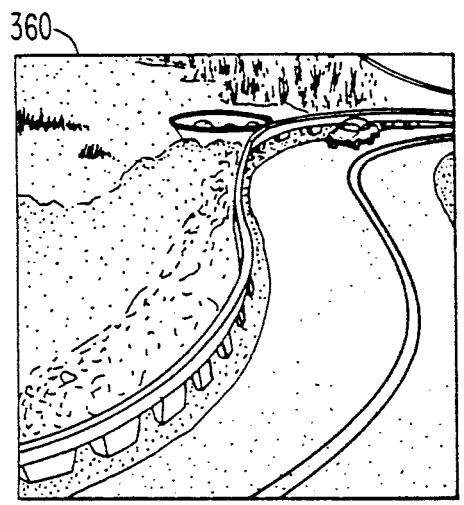
FIGS. 21(a)-21(b), 22(a)-22(b), 23 and 24 illustrate the production of a fractal transform representing a grayscale image.
Figure 21B:
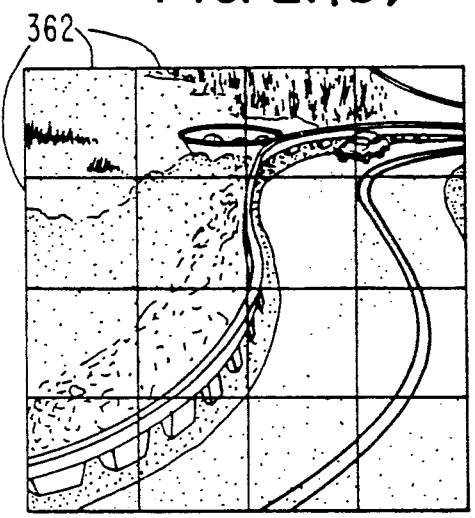
Figure 22A:
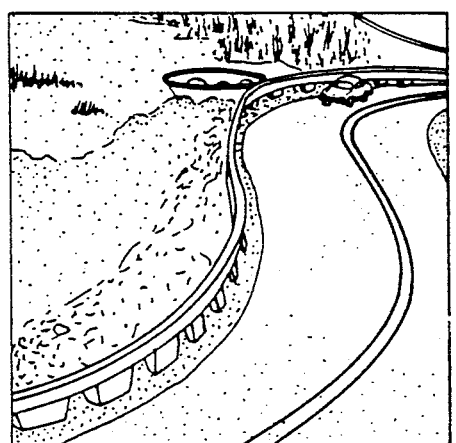
Figure 22B:
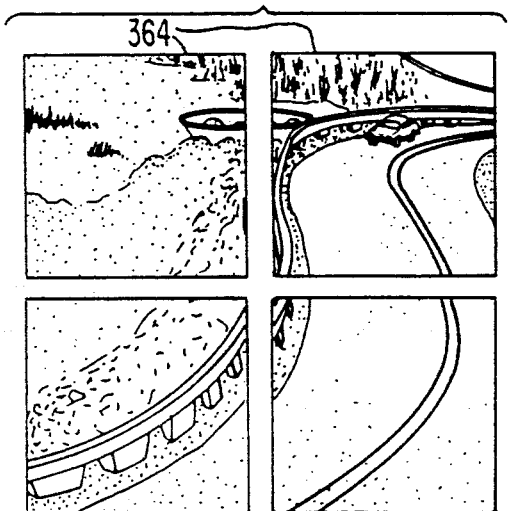

The present invention is suitable for processing grayscale images as well as for processing black and white images. A grayscale image is an image formed of pixels which may have any one of a plurality of graduated light intensities, ranging from completely black to completely white. FIGS. 21-24 illustrate a preferred process by which a fractal transform of an input digitized grayscale image 360 is found. Image 360 is divided into domain blocks 362, and range blocks 364 as shown in FIGS. 21 and 22, respectively. Additional range blocks may also be created by procedures such as rotation and reflection, as described previously with respect to black and white range blocks.

Figure 23:
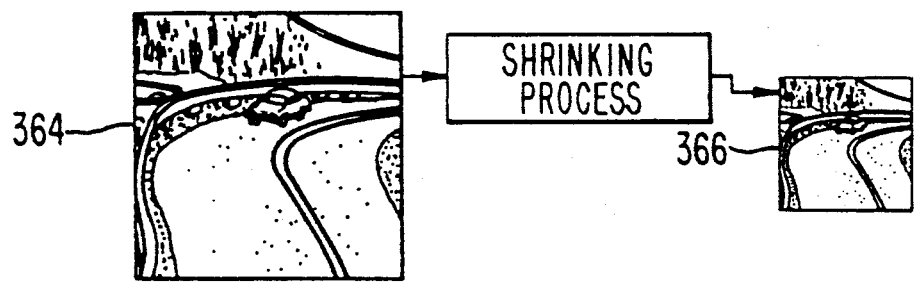

A shrinking process is then applied to the range blocks to produce shrunken range blocks 366, as shown in FIG. 23. The shrinking process is such that the shrunken range blocks contain the same number of pixels as the domain blocks and can employ shrinking techniques as described above with respect to black and white images. However, unlike the procedure for processing black and white images, there is no escape block included among the shrunken range blocks. Each pixel of the domain blocks and shrunken range blocks has a number associated with it which represents its grayscale value, i.e. the brightness of the pixel. For example each pixel in image 360 (FIGS. 21 and 22) has a grayscale value of 0-255.

Figure 24:
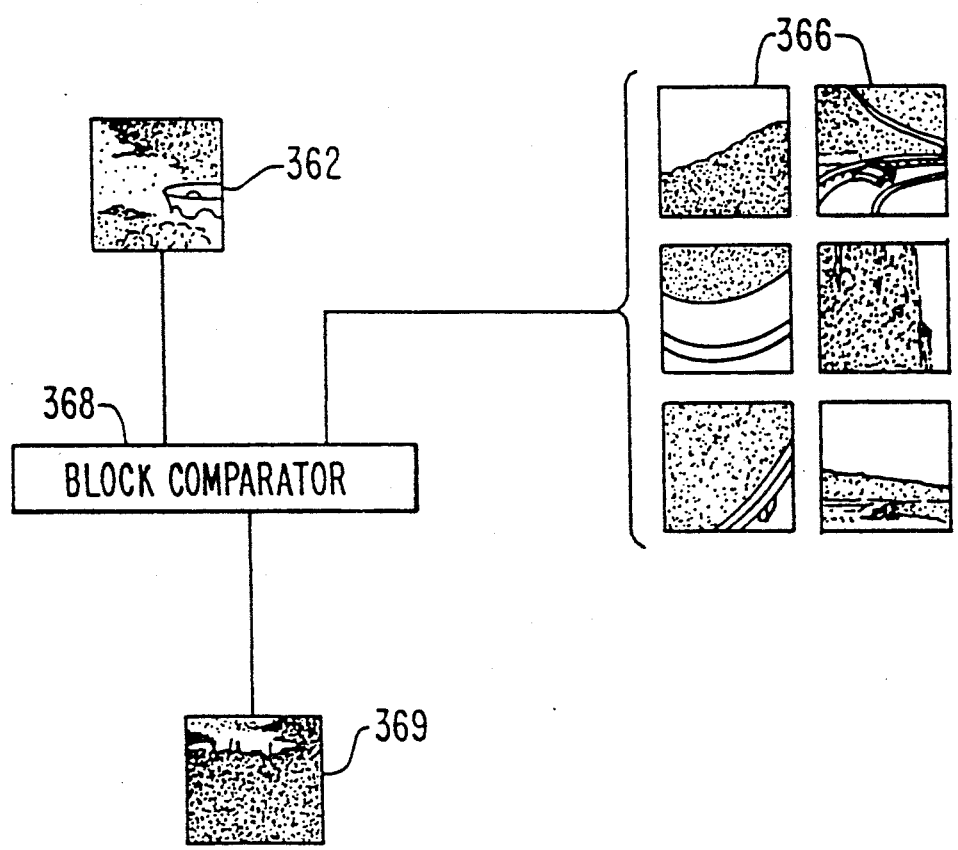

As shown in FIG. 24, each domain block 362 is compared to shrunken range blocks 366 associated with a single shrunken range block 369 which most closely corresponds to the domain block. This association will be described below in greater detail with respect to FIG. 25 and is performed by a block comparator 368 which compares the grayscale values of the pixels of each block to grayscale values of pixels in each shrunken range block 366. To assist in finding a shrunken range block 369 which closely corresponds to a domain block, vertical scaling parameters P and Q may be applied to domain block pixel grayscale values $V_{GS}$ to obtain a new pixel grayscale value $V'_{GS} = PV_{GS} + Q$.

Figure 25:
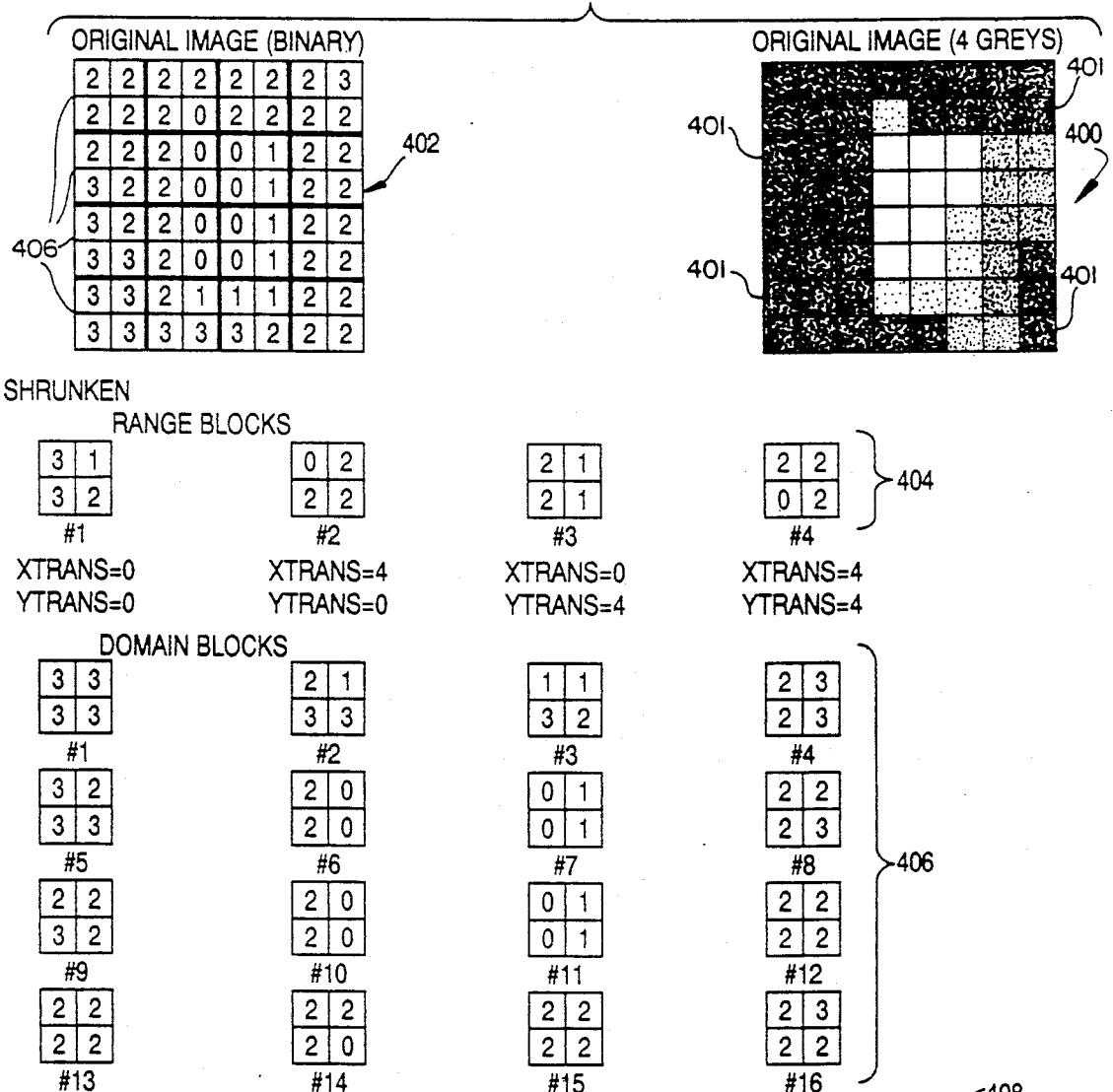
FIG. 25 illustrates a method for representing a grayscale image, having four possible levels of gray, in binary form.

FIG. 25 provides further explanation of the processing of grayscale images. A grayscale image 400 formed of pixels 401 having four possible levels of gray can be represented in binary form as shown at 402. Thus, each pixel in binary representation 402 has its intensity level represented by a value of 0-3.

Shrunken range blocks 366 can be constructed from the binary representation 402. First, four binary representation of range blocks 364 can be constructed as the lower left (1), lower right (2), upper left (3), and upper right (4) quadrants of binary image representation 402. These range block binary representations are then processed by shrinking techniques as described above to form shrunken range blocks 404.

Binary representation 402 is also divided into binary domain blocks 406. The binary domain blocks are numbered 1-16 in order from left to right and from bottom to top of binary representation 402. Each of binary domain blocks 406 are a 2×2 pixel array of non-overlapping subsets of binary image representation 402. The domain block size is chosen to be the same as the shrunken range block size.

Using a value of P equal to 0.5 and values of Q as indicated in FIG. 25 to compute new pixel grayscale values $V'_{GS} = PV_{GS} + Q$, the Hausdorff distances between each binary domain block 406 and each binary shrunken range block 404 are calculated, and the most similar binary shrunken range block 404 is selected for each binary domain block 406. The results are shown in table 408 of FIG. 25. Table 408 shows that domain blocks 1-6, 8-10, and 14 are each most similar to shrunken range block 1; domain blocks 7, 11, and 16 are most similar to shrunken range shrunken range block 2; and domain blocks 12, 13, and 15 are most similar to shrunken range block 3. The fractal transform 410 of image 400 then consists of the sequential list of shrunken range block numbers along with vertical scaling parameters P and Q, as shown in table 408 and in FIG. 26.

Figure 26:
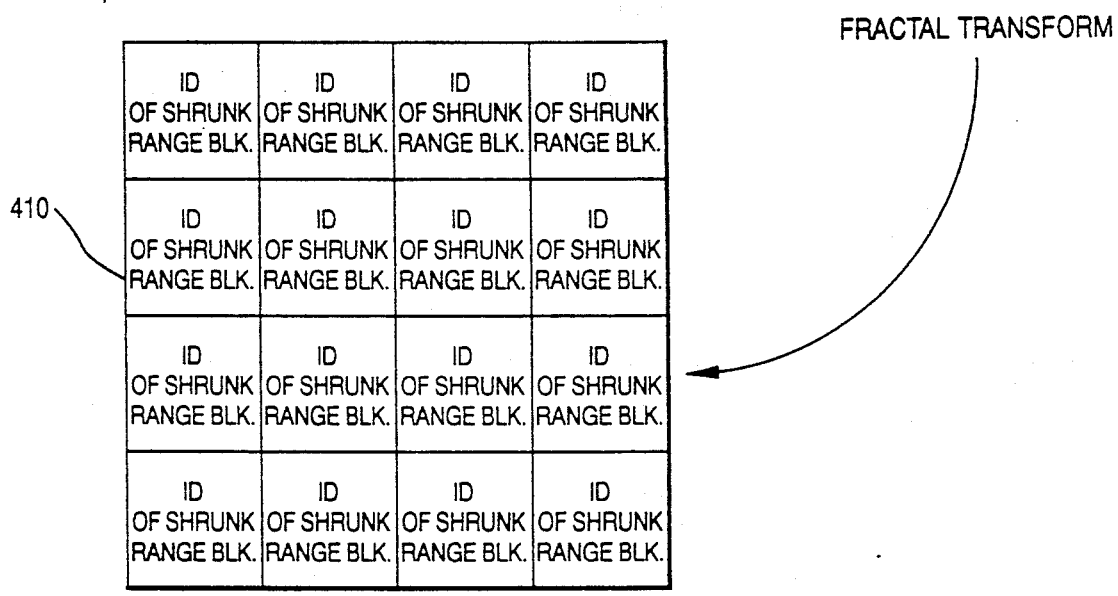
FIG. 26 shows a fractal transform of the grayscale image of FIG. 21.

The corresponding fractal transform 410 for grayscale input image 60 is thus a list of identifiers consisting of the "addresses" of the shrunken range blocks and associated vertical scaling parameters, one address and set of vertical scaling parameters being associated with each domain block, as shown in FIG. 26. Although no procedures, such as rotation and inversion, have been discussed in the explanation of FIG. 25 in order to avoid unnecessary complication of explanation, the preferred embodiment employs such procedures, and the codes specifying the procedures are included in each identifier of the fractal transform.

Figure 27:
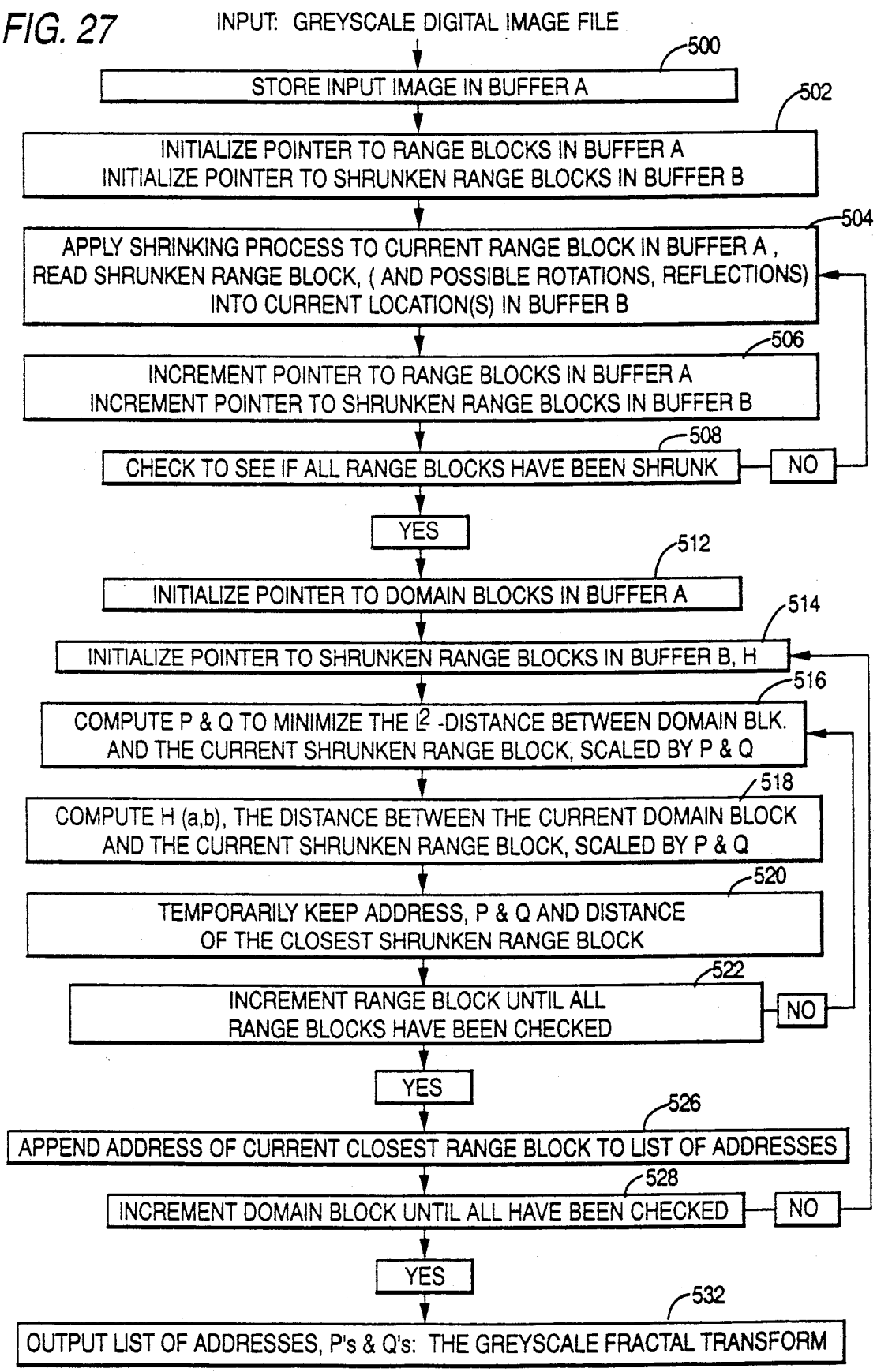
FIG. 27 is a logic flow diagram showing a method for automatically creating a fractal transform representative of grayscale image data.

FIG. 27 shows in detail a preferred method for automatically creating a fractal transform representative of grayscale image data in accordance with the present invention. At step 500, digital image data representing a grayscale image is stored in buffer A of a data processor. At step 502, a range block pointer for buffer A and a shrunken range block pointer for buffer B are initialized. At step 504, predetermined procedures are applied to the range block of buffer A specified by the range block pointer. Such procedures include local affine transforms, such as rotation, reflection, or inversion prior to shrinking to obtain a greater number of shrunken range blocks for a given input image. The processed range blocks are then stored into buffer B at the locations indicated by the shrunken range block pointers.

The range block pointer for buffer A and shrunken range block pointer for buffer B are then appropriately incremented at step 506, and the range is examined at step 508 to see whether all range blocks have been accessed. If not, steps 504 and 506 are repeatedly executed until all range blocks have been accessed. A domain block pointer for buffer A is initialized at step 512 and the shrunken range block pointer for buffer B is initialized in step 514.

At step 516, vertical scaling parameters P and Q are determined to minimize the $L^2$ distance between the domain block addressed by the domain block pointer and the shrunken range block addressed by the range block pointer. As is well known to those skilled in the art, L distances are used to measure the distances between graphs of functions rather than between sets of points. A digitized grayscale image can be thought of as a function formed from a two dimensional array of indices representing pixel locations in an image indicating the intensity value associated with the pixels. That is, the function f(i,j) represents the intensity at pixel i,j where i,j specify the location of the pixel in the image array. An L distance compares two functions by appropriately summing and in some way averaging the differences between the intensities at each pixels. It is an $L^2$ distance if the differences are squared before they are summed, in which case the "averaging" is achieved by taking the square root of the sum. It is an $L^1$ distance if the absolute values of the differences are utilized. If the L distance between two images is small then the two images look alike. L distances have the advantage that they generally can be calculated faster and easier than Hausdorff distances. In particular, a weighted $L^2$ distance $D_L$ is used in the preferred embodiment to select vertical scaling parameters P and Q and is expressed as;

$$D_L = \sqrt{\sum_{i=1}^{N} |x_i - y_i|^2 w_i}$$

where: $x_i, y_i$ are indexed intensity values in respective images, $w_i$ are non-negative numbers, and N is the number of pixels in each image.

The distance between digital grayscale images A and B (or blocks taken therefrom) can be measured using both Hausdorff distances and using L distances. In the first case the images are treated as a sets of points in a three dimensional array and in the second case they are treated as functions. In the embodiment shown in FIG. 27, $L^2$ distances are used in selecting P and Q values.

At step 518, the Hausdorff distance between the domain block specified by the domain block pointer and the shrunken range block specified by the shrunken range block pointer and scaled by P and Q is determined. The Hausdorff distance is computed in the same manner as described with respect to FIG. 10. A determination is then made at step 520 if the value computed at step 518 is less than the currently stored value. If so, the currently stored value is replaced by the value just computed at step 518, along with the identifier of the shrunken range block which was used to generate the value just computed. If the value computed at step 518 is not less than the currently stored value, the value just computed is discarded.

At step 522, the range block pointer is incremented and a determination made as to whether all range blocks have been checked. If not, the method of FIG. 22 loops back to steps 516-522 until all shrunken range blocks have been checked.

The identifier stored by the loop consisting of steps 516-522 is then appended at step 526 to a list of identifiers each representing one of the domain blocks of the input image data stored in buffer A. The domain block pointer is incremented at step 528 and a determination made whether all domain blocks have been processed. If not, steps 516-528 are repeatedly executed until all domain blocks have been processed. The list of identifiers, each corresponding to one of the domain blocks of the original input data, is then output at step 532 as the fractal transform according to this method of image data representing the input grayscale image.

Figure 28:
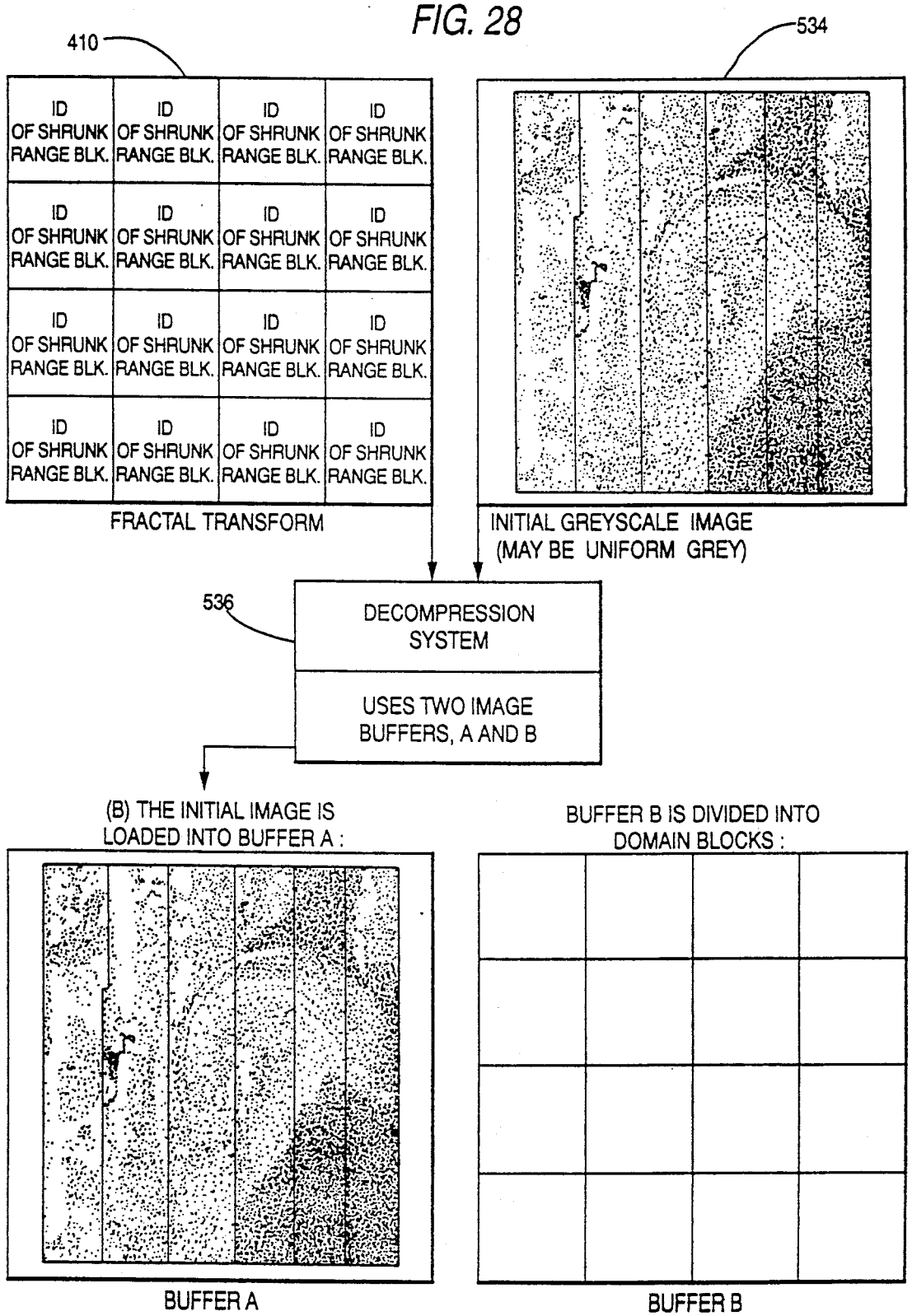
FIG. 28 shows a decompression system for decoding the fractal transform shown in FIG. 26 to obtain the original grayscale image of FIG. 21.

FIG. 28 illustrates how a grayscale image is recovered from a fractal transform 410 (which includes scaling parameters). An arbitrary initial image 534 and a fractal transform 478 are input to a decompression system 536, preferably embodied in a data processor. Initial image 534 is loaded into a buffer A. A buffer B is partitioned into domain blocks; and into each domain block is read a shrunken range block which is specified by the corresponding address of fractal transform 410, scaled as specified by the vertical scaling parameters. The shrunken range block is constructed from initial image 534 in buffer A. Image 534 in buffer A is treated, addressed, and processed into shrunken range blocks, in exactly the same manner as the original image. Each of the identifiers forming the grayscale fractal transform corresponds to one of the domain blocks in buffer B of FIG. 28 and is used to select a shrunken range block from buffer A to read into the corresponding domain block, thus forming an interim image in buffer B. The interim image in buffer B is now read back into buffer A, and buffer B is cleared. The steps of reading into each domain block of buffer B a shrunken range block of buffer A specified by a corresponding address of the fractal transform to form an interim image, and reading the interim image of buffer B into buffer A are repeated either a prescribed number of times or until "convergence" is achieved.

In general, the number of iterations of the steps of placing shrunken range blocks in buffer B and replacing contents of buffer A with contents of buffer B depends on the dimensions (measured in pixels) of the domain blocks and range blocks. The number of iterations may also be determined experimentally, by detecting convergence, defined as when the successive images in buffer B do not change by more than a predetermined amount. The decoded image is the one which is finally obtained after the iterative process is complete.

Figure 29:
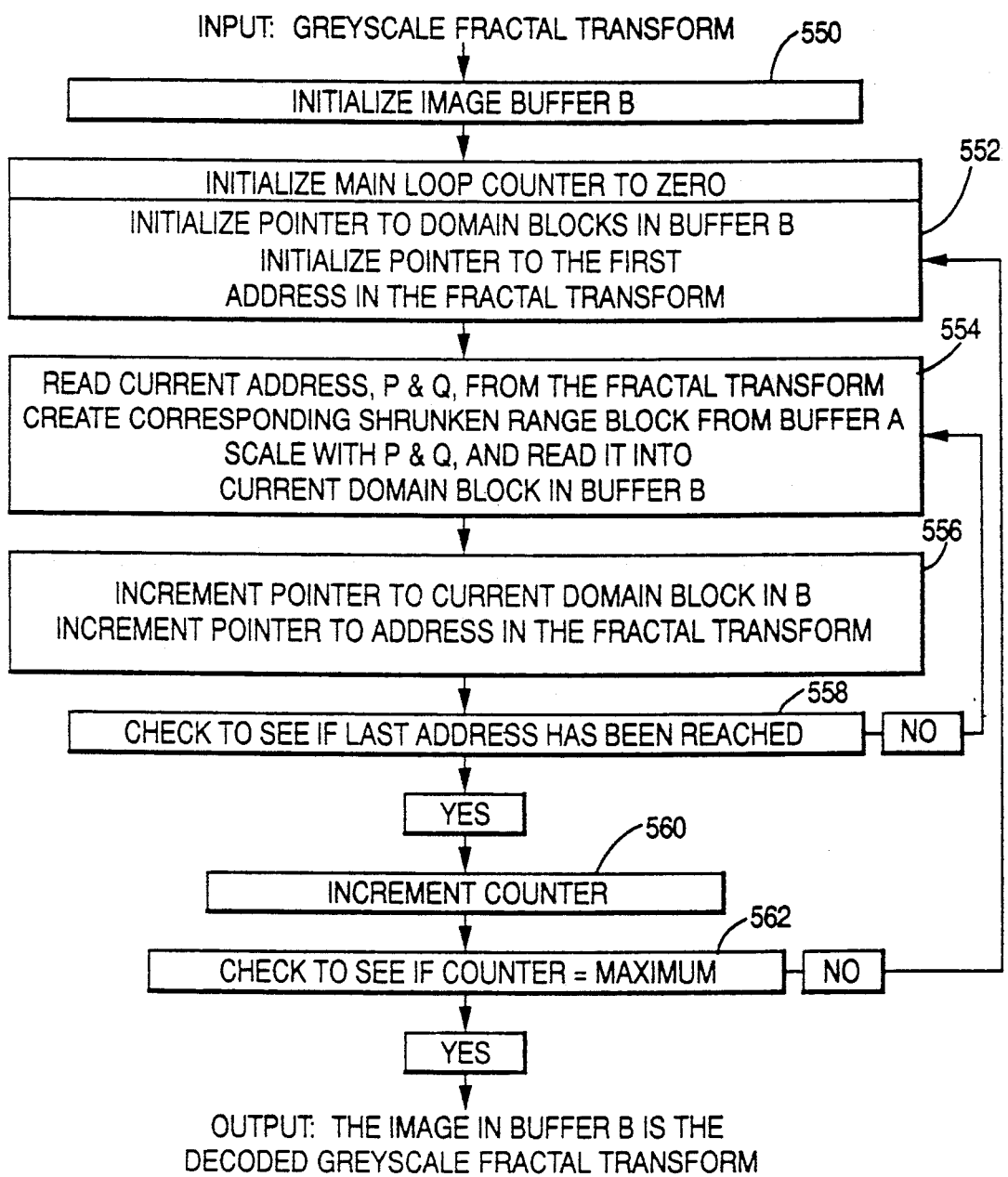
FIG. 29 is a logic flow chart of a method for decoding the grayscale fractal transform of FIG. 26.

FIG. 29 shows a logic flow diagram which constitutes a preferred embodiment for decoding a grayscale fractal transform such as the one generated by the method of FIG. 27. First, an initial image is supplied to buffer B, as indicated at step 550. Next, a main loop counter, a domain block pointer for buffer B, and a fractal transform pointer are initialized, as indicated in step 552. The next entry of the fractal transform as specified by the fractal transform pointer, is obtained at step 554 and a corresponding shrunken range block is created from buffer A. The range block is then scaled with vertical scaling parameters P and Q and read into a domain block of a corresponding position in buffer B. At step 556, domain block pointer for buffer B and the fractal transform pointer are incremented. A determination is made at step 558 whether the last domain block and fractal transform have been processed. If not, the method loops back through steps 554 and 556 until each entry of the fractal transform has been processed.

The main loop counter is incremented at step 560. If the prescribed number of iterations has not been reached (step 562), the method loops back to step 552 and creates a domain block in buffer B from each fractal transform entry. The process continues until the prescribed number of iterations has been reached. At that time, the contents of buffer B are provided as data representative of the grayscale image previously compressed into the input fractal transform.

A numerical example of the construction of a grayscale fractal transform using vertical scaling parameters will now be described. Using the procedure shown in FIG. 27 with $8 \times 8$ domain blocks and $16 \times 16$ range blocks, the $256 \times 256$ grayscale was converted to digital data. The original image data required 65,536 bytes of memory for storage. After processing using the method of FIG. 27, a fractal transform was produced which required 2,560 bytes of memory for storage.

Other sizes of domain blocks and range blocks, as well as different numbers of range blocks could, of course be used. Decreasing the block size increases the number of blocks and increases the fidelity of the compression/decompression process. That is, the difference between the original and decoded images is reduced. Exact compression results when there is no difference between the original image and the decompressed image when viewed at a specified screen resolution. However, decreasing the block size and increasing the number of possible range blocks also increases the length of search when determining the closest shrunken range block. This in turn increases the processing time for a given type of computer or increases expense if a more powerful computer is used to eliminate the potentially greater processing time.

The present invention also provides a method for enhancing images. Image data representing a grayscale image at a first resolution is stored in the data processor. For example, data from an image comprising an array of $256 \times 256$ pixels is supplied as input to the method of FIG. 27. A fractal transform is obtained using the method. The fractal transform is then decoded at a second resolution higher than the first resolution to produce output image data by decoding the fractal transform using the method of FIG. 29 including a pair of larger buffers to produce an output image array larger than $256 \times 256$. For example, use of buffers in the method of FIG. 29 to provide a $512 \times 512$ output array yields an image having a resolution of twice that of the original input image. If a type face is used to form a set of input images, this technique can be used to provide a scalable font. That is, fractal transforms representing the symbols of the type face can be decoded to any desired resolution to provide multiple fonts of the type face symbols at any desired size.

Figure 30:
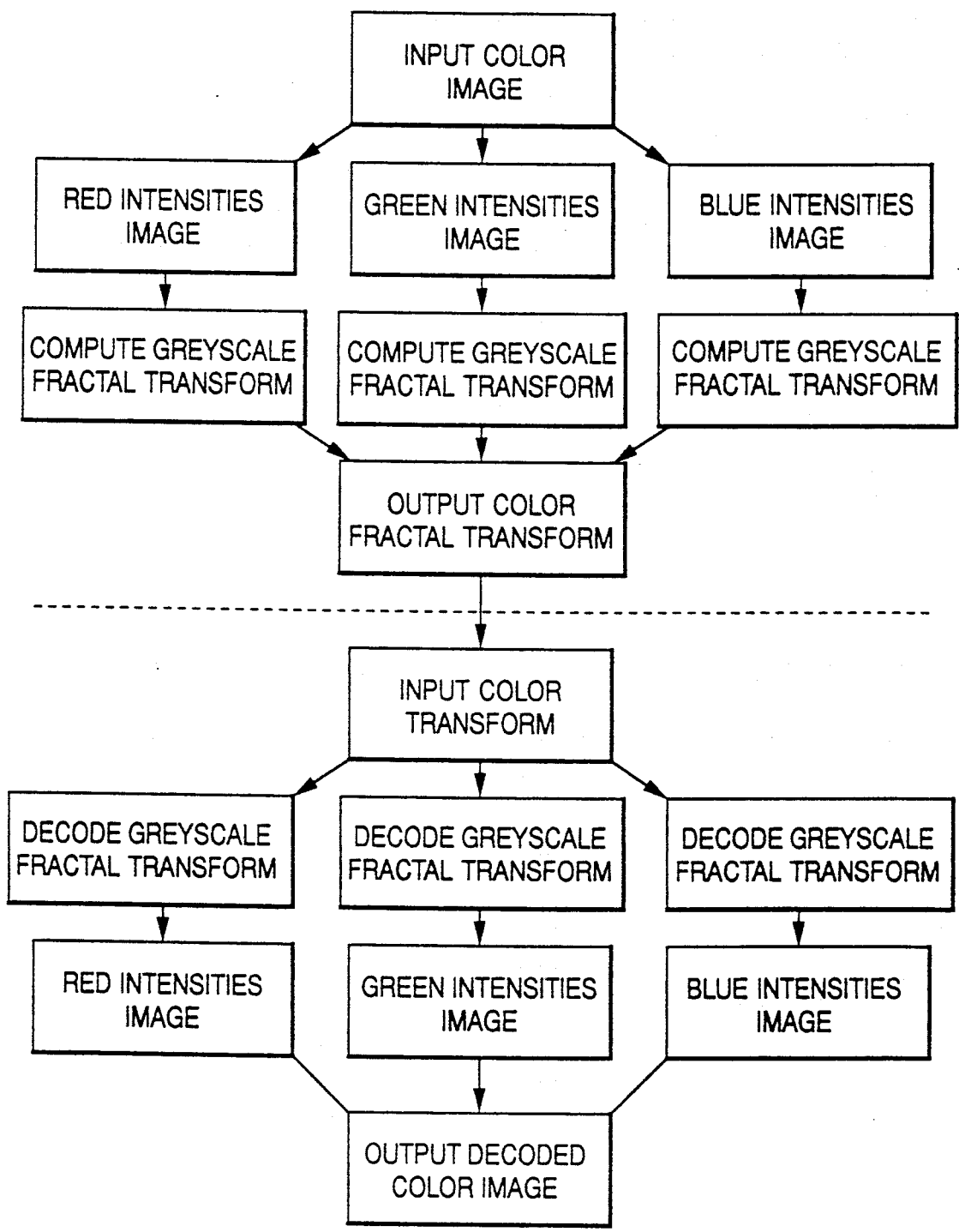
FIG. 30 is a logic flow chart of a method for compressing and decompressing color images.

The invention may also be used to compress and decompress color images, as shown in FIG. 30. Digital data representing a color image is input and a trio of grayscale fractal transforms are produced, one for each of primary colors red, green, and blue. The three fractal transforms are concatenated to form a color fractal transform. To reproduce the original color image from the compressed data of the color fractal transform, the color fractal transform is separated into individual fractal transforms representing grayscale fractal transforms of red, green, and blue images. The individual fractal transforms are then decoded using, for example, the method shown in FIG. 29, to produce red, green, and blue intensity images. These intensity images are combined in a manner well known in the art and are output as a decompressed color image.

While the algorithms for decoding of the grayscale fractal transform can be implemented in a wide variety of general purpose computers, it will be appreciated that the small variation in operations required and large numbers of operations can be efficiently embodied in a special purpose computation device. Accordingly, preferred apparatus for processing digital image data using the methods described above is shown in FIG. 31.

Figure 31:
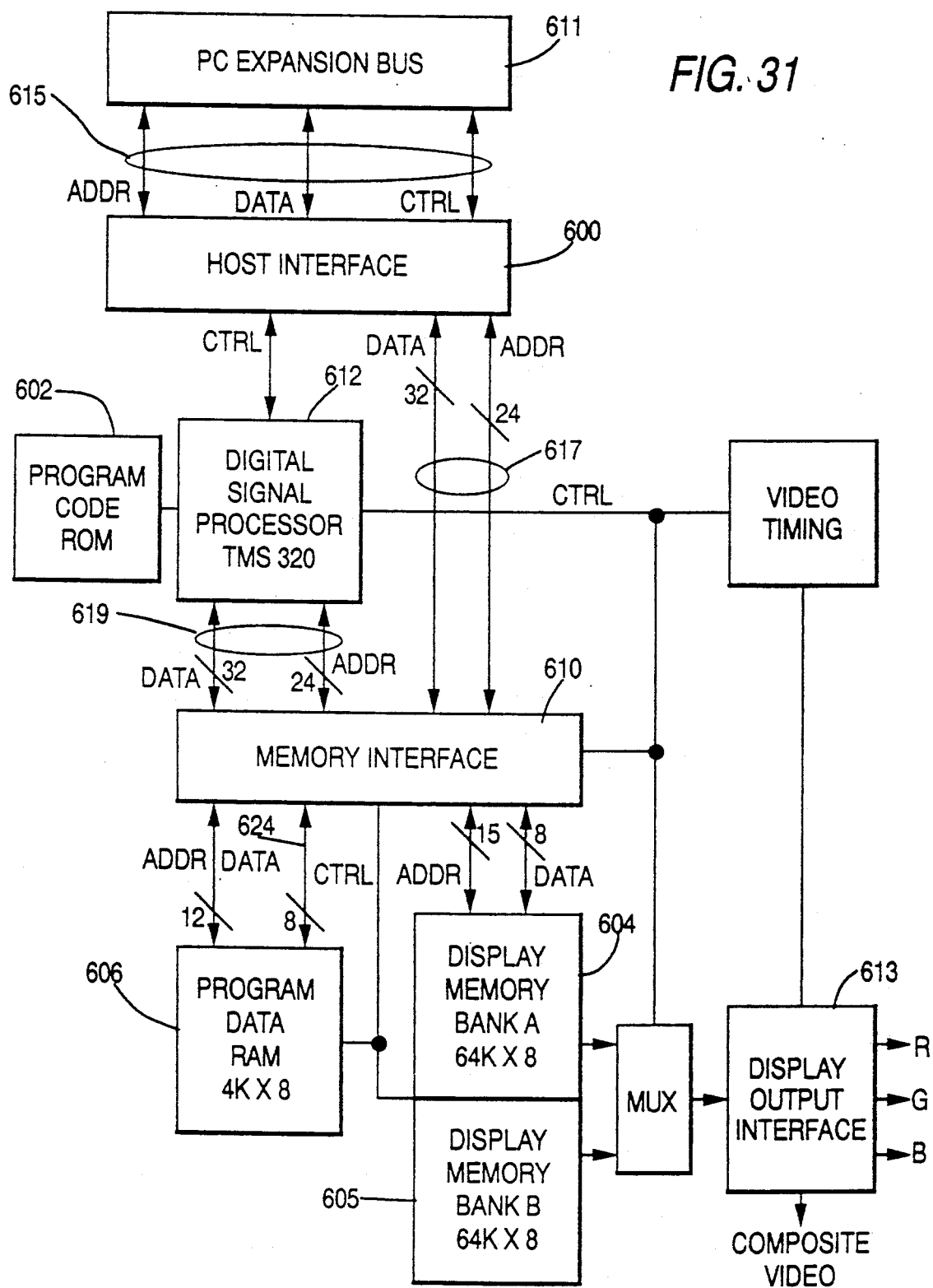
FIG. 31 is a block diagram of apparatus which constitutes a preferred embodiment for performing the method of FIG. 20

The apparatus of FIG. 31 includes a host interface 600, memory 602, 604, 605, and 606, a memory interface circuit 610, a digital signal processor 612, and display output interface 613 on a printed circuit board which is compatible with PC/AT type computers based on the Intel 80286 central processing unit.

The digital signal processor 612 and the memory interface 610 are connected to a PC expansion bus 611 for receiving commands and data. The preferred digital signal processor 612 is a TMS320C30 manufactured by Texas Instruments, Incorporated. Details concerning the operation of the preferred digital signal processor 612 are available in the literature supplied by the manufacturer.

It will be understood that while the digital signal processor 612 employed in the disclosed embodiment is capable of performing a wide variety of floating point operations, the purpose for which it is used in the present invention is to provide high speed implementation of the arithmetic portions of a fractal transform decoding method, such as shown in FIG. 29. Accordingly, it will be understood that the other functions which could be carried out by the digital signal processor 612 are not employed in the disclosed embodiment. In particular, although the digital signal processor 612 generally operates on thirty two bit data, in the disclosed embodiment, it adds and multiplies signed eight bit data provided by the memory interface 610 in response to a sequence of instructions contained in the program code ROM 602.

These primary components operate to decode a set of range block addresses and transfer the results of the decoding process to the screen buffer 604 and 605, forming display memory banks A and B, which in the disclosed embodiment consists of a single 262,144 by 4 bit multiport video RAM TMS44C251 manufactured by Texas Instruments, Incorporated. Details concerning the operation of the preferred display memory banks A and B are available in the literature supplied by the manufacturer.

In the disclosed embodiment, the data set representing an image is an array of 256 pixels by 256 pixels, although it will be appreciated that the size of this array is arbitrary and that a larger array gives rise to greater resolution. Moreover, it should be understood that the data set representing the image is the same for the display resolution, the screen buffer resolution, and for all arithmetic calculations. In the disclosed embodiment, each pixel intensity value is represented by an eight bit value so that images having two hundred fifty six gray or pseudo-color intensity levels can be decoded, although it will be appreciated that the size of this array is arbitrary and that more than eight bits per pixel gives rise to more than two hundred fifty six intensity levels, while less than eight bits per pixels gives rise to less than 256 intensity levels. In particular, twenty four bits per pixel would give rise to sufficient intensity levels to describe two hundred fifty six intensity levels each of red, green and blue primary components.

The preferred display memory banks A and B, although physically one device, are conceptually treated as two banks of memory. One bank is thought of a containing the "current image" and is used as the source of image data. The other is thought of as containing the "new image" and is used as the destination of image data. During the iterative decoding process, the roles of the memory banks are interchanged. The banks are distinguished by a memory start address offset which in the case of bank A is 0 and in the case of bank B is 131,076 (measured in four bit memory locations). Each bank is of sufficient size to contain an entire $256 \times 256 \times 8$ bit image. The memory interface 610 contains address generators to generate arrays of data corresponding to square subimages. The subimages are determined by a row and column address of the upper left hand corner of the subimage and a size. The subimage with upper left hand corner row equal to R and column equal to C and dimension S is denoted by sub(R,C,S). Sub(R,C,S) contains S times S pixel locations and contains all the pixel locations from row R to row $R+S-1$ and from column $C+S-1$.

The host interface 600 receives and transmits signals and data from the expansion bus 611 of an IBM PC/AT on PC address, data and bus control lines 615. Data and addresses are sent to the memory interface 610 on the lines 617. The memory interface 610 consists of memory address generators and address sequencers. Two types of data transmit the memory interface 610. Image codes are placed into and retrieved from program data RAM 606 which is 4096 by 8 bits. The image code is preceded by a byte of data, the format byte. The low four bits, bits 0,1,2,3, of the format byte determine the domain block size and therefore the range block size, since the range block size is always twice the domain block size in the disclosed embodiment. Valid values of the domain block size are 4–16. Both the domain blocks and range blocks are square in the disclosed embodiment. Thus, one dimension completely specifies the domain block size.

The format byte is stored in a static RAM format register in the memory interface 610. The format byte is used by the digital signal processor 612 to compute the actual dimensions of the displayed image in pixels. The dimension of the displayed image may be somewhat less than 256 by 256. It is determined as the largest number of pixels which is a multiple of the domain block size and which is simultaneously no larger than 256. For example, if the domain block size is 5, then the image width and height in pixels is 255 and not 256. This is because 51 times 5 is 255, which number is not larger than 256, while 52 times 5 is 260, which exceeds 256. The number is computed by integer dividing 256 by 5 and then integer multiplying by 5. A list of image size values as a function of format value is now provided in the format i,f; where i is image size and f is format value: 256,4; 255,5; 252,6; 252,7; 256,8; 252,9; 250,10; 253,11; 252,12; 247,13; 252,14; 255,15; 256,16.

The result is stored in an eight bit image size static RAM register in the memory interface 610.

An address sequencer in the memory interface 610, using FORMAT (the format register value), generates addresses in the program data RAM 606 to store the image codes which are transmitted from the host interface 600 into the memory interface 610. The program data RAM 606 consists of 4096 memory locations, each one byte wide. An image code may consist of up to 2048 codes, each of which occupies two bytes of the program data RAM. CODELENGTH, the number of two-byte program data RAM words which contain valid data, is the square of (the value in image size divided by the value in, FORMAT) CODELENGTH varies between 256 and 2048 as the value in format varies between 4 and 16. The sixteen bits of the first CODELENGTH words in the program data RAM contain both address and transform information. The partitioning of each such word between address and transform information depends on the value in the format register according to the following formula:

| FORMAT Value | Address Bits | Transform Bits |
| --- | --- | --- |
| 4–7 | 0–11 | 12–15 |
| 8–15 | 0–9 | 10–15 |
| 16 | 0–7 | 8–15 |

The address bits are divided in equal parts to form a row address and a column address according to the following table:

| FORMAT Value | Row Address Bits | Column Address Bits |
| --- | --- | --- |
| 4–7 | 0–5 | 6–11 |
| 8–15 | 0–4 | 5–9 |
| 16 | 0–3 | 4–7 |

It will be appreciated that although the numbers of bits allocated to the row address and column address are equal in each code word, the value of those bits may vary from row address to column address and from code word to code word. The row address bits and column address bits are used to address upper left hand locations of range blocks. Valid values for the row and column address vary according to the value in FORMAT. These address can range from 0 to a maximum value as expressed in the following list. The list is given as (m,f) where m is the maximum address value for a given format value:
(63,4)(50,5)(41,6)(35,7)(31,8)(27,9)(24,10)(22,11)(20,12)-(18,13) (17,14)(16,15)(15,16)

In the disclosed embodiment, pixel row and column addresses are computed by multiplying the row address and column address values by the domain block size stored as the value in FORMAT. The address generator of memory 610 then determines physical memory address in the display memory banks 604 and 605.

The transform bits are used, together with the values in NUMSCALE and DENOMSCALE registers in the memory interface 610, to carry out the grayscale fractal transform decoding operation. The digital signal processor 612 receives both of the signed eight bit NUMSCALE and DENOMSCALE values over the lines 619. In the disclosed embodiment, these values are selected by an operator and are fixed for an entire image computation. It will be understood that providing a larger program data RAM would permit distinct NUMSCALE and DENOMSCALE values to be used for each code word. The NUMSCALE and DENOMSCALE values are loaded from the PC/AT host to the host interface on lines 615 and from the host interface to the NUMSCALE and DENOMSCALE registers in the memory interface 610 on lines 617.

The decoding steps of the grayscale fractal transform are carried out in an initialization step and repeated decoding iteration steps. The instructions required to carry out the decoding procedure are loaded from the program ROM 602 which is connected to the digital signal processor 612.

Initialization Step: An initialization signal is sent from the PC/AT host on the lines 615 to initialize the memory interface 610. The memory interface 610 now receives twenty six bits, the first eight of which are stored in the format register, the next nine of which are stored in the NUMSCALE register and the final nine of which are stored in the DENOMSCALE register. A code counter is now initialized to the value of 16 times CODELENGTH. Bits are now loaded from the PC/AT host over the data lines 615 to the host interface and from there over the data lines 617 to the memory interface 610. An address sequencer in the memory interface 610, having been initialized by the initialization signal above, provides successive addresses in the program data RAM 606 and transfers the data bits it receives to the byte memory areas so addressed. The code counter is decremented with each bit and the data transfer process halts when it reaches zero. A signal is then sent to the digital signal processor 612 to load the program from the program code ROM 602. The values in the NUMSCALE and DENOMSCALE registers are transferred to memory locations in the RAM of the digital signal processor 612. The value of FORMAT is also transferred to a memory location in the RAM of the digital signal processor 612, which computes and stores the value of CODELENGTH as described above. Another digital signal processor RAM address location, display bank, is cleared.

Decoding Iteration Step: A memory location configured as a block counter in the RAM of the digital signal processor 612 is set at the starting address of the program data RAM 606, which is contained in the program code ROM 602. Each Decoding Iteration Step consists of CODELENGTH iterations of Block Decoding Steps. The value of display bank is sent to the memory interface 610 and stored in a bank register on the memory interface 610.

Block Decoding Step: At the start of a Block Decoding Step, the value of BLOCK COUNTER in the digital signal processor 612 is passed on the data lines 619 to the memory interface 610. The eight bits of data at that address in the program data RAM and the next eight bits of data are passed back to the memory interface 610 on data lines 619. The transform bits of the code word are sent on data lines 13 to the digital signal processor 612 and stored in a memory location, Q, in the digital signal processor 612. The row and column address bits of the code word are used by the display address generator on the memory interface 610 to generate the addresses of a square block, with horizontal and vertical dimension equal to two times FORMAT, of pixel data in the display memory bank. If the value of display bank is 0 then the addresses are generated in display memory bank B 605. The upper left hand corner of the square block is generated as that pixel on the FORMAT times row address row and format times column address column. The image data in this square block is SUB(ROW ADDRESS times FORMAT,COLUMN ADDRESS×FORMAT,2×FORMAT). The addresses are generated as 2 by 2 subblocks of this square block as with row addresses SUBROW=ROW ADDRESS×FORMAT+2×i and column addresses SUBCOL=-COLUMN ADDRESS×FORMAT+2×j.

The address generator initializes counters with values i and j at 0 and then increments j until j reaches FORMAT, at which time it is reset to 0. When j is reset, then i is incremented until i reaches FORMAT when it is reset to 0. A register in the digital signal processor 612, PIXEL, is cleared. For each value of i and j between 0 and FORMAT-1 inclusive. the byte values at the byte of pixel data stored at the address locations of the four pixels in SUB(SUBROW,SUBCOL,2) is sent over the address lines of 619 to the memory interface 610 and then over the data lines of 619 to the digital signal processor 612 and accumulated in the PIXEL register.

After all four values have been received, the value is right shifted two places to effect a division by 4. Q is added to the result of (PIXEL×NUMSCALE divided by DENOMSCALE) and the result of this computation is stored in a digital signal processor register 612, NEWPIXEL.

A second address generator in the memory interface 610 determines destination addresses in the display memory. The pixel coordinates of the upper left hand coordinates are computed by the second address generator. The pixel row of this location is DESTROW=(BLOCKCOUNT/(IMAGE SIZE/FORMAT)) times FORMAT.

The pixel column address of this location is

DESTCOL=(BLOCKCOUNT%(IMAGESIZE/FORMAT)) times FORMAT where X%Y denotes the remainder of integer division of X by Y.
The addresses of the FORMAT times FORMAT pixels in

SUB(DESTROW,DESTCOL,FORMAT)

are computed as the counters i and j vary. NEWPIXEL is sent over the data lines 13 to the memory interface 610 and stored in the destination display memory address of the pixel located at row=DESTROW+i and column DESTCOL+j. When all FORMAT times FORMAT pixels in SUB(DESTROW,DESTCOL,FORMAT) are replaced with NEWPIXEL values in this manner, counters i and j are cleared and BLOCKCOUNT is incremented.

This completes a Block Decoding Step. The Block Decoding Step is repeated CODELENGTH many times with the incremented blockcount values. The value of display bank is replaced by 1−the value of display bank and consequently alternates between 0 and 1. The Decoding Iteration Step is then completed.

The display of the image is carried out essentially asynchronously with the computational decoding. Pixel values are indeed read out of the display memory asynchronously, but the memory bank which is used as the source of the display pixels is specified by the value of display bank. The display output interface 613 provides the R-G-B output. The video output logic timing device 617 drives the preferred color pallet, a Brooktree Bt453RAMDAC, not shown in FIG. 31.

The ratio of the image code to the decoded image size is called the compression ratio of the device. The compression ratio of the device may be computed by dividing twice CODELENGTH by the square of image size. The disclosed embodiment yields compression ratios varying from 1:16 when FORMAT contains the domain block size value of 4 to a compression ratio of 1:128 when the value of FORMAT is 16. The restriction of FORMAT values to vary between 4 and 16 is arbitrary. Larger values of FORMAT lead to larger compression ratios.

An intended purpose of the disclosed decoding device is to provide an economical means of decoding images which have been encoded by the grayscale fractal transform. The usefulness of the device can also be measured in the compression ratio which it achieves. The compression ratio can be effectively increased by compressing the fractal transform codes by traditional compression of a grayscale fractal transform For example, publicly available Huffman encoding schemes could be used to encode the fractal transform codes. The Huffman encoded fractal transform codes are then Huffman decoded before transmission to the disclosed apparatus for decoding the fractal transform.

Use of the fractal transform techniques described herein has a significant advantage over prior art techniques such as vector quantization and Huffman coding in that no look-up tables are used. Thus, the compression ratio can be easily changed, the system can be used in an adaptive mode, useful in applications such as DVI and preparation of old movies for transmission along telephone lines.

Figure 32:
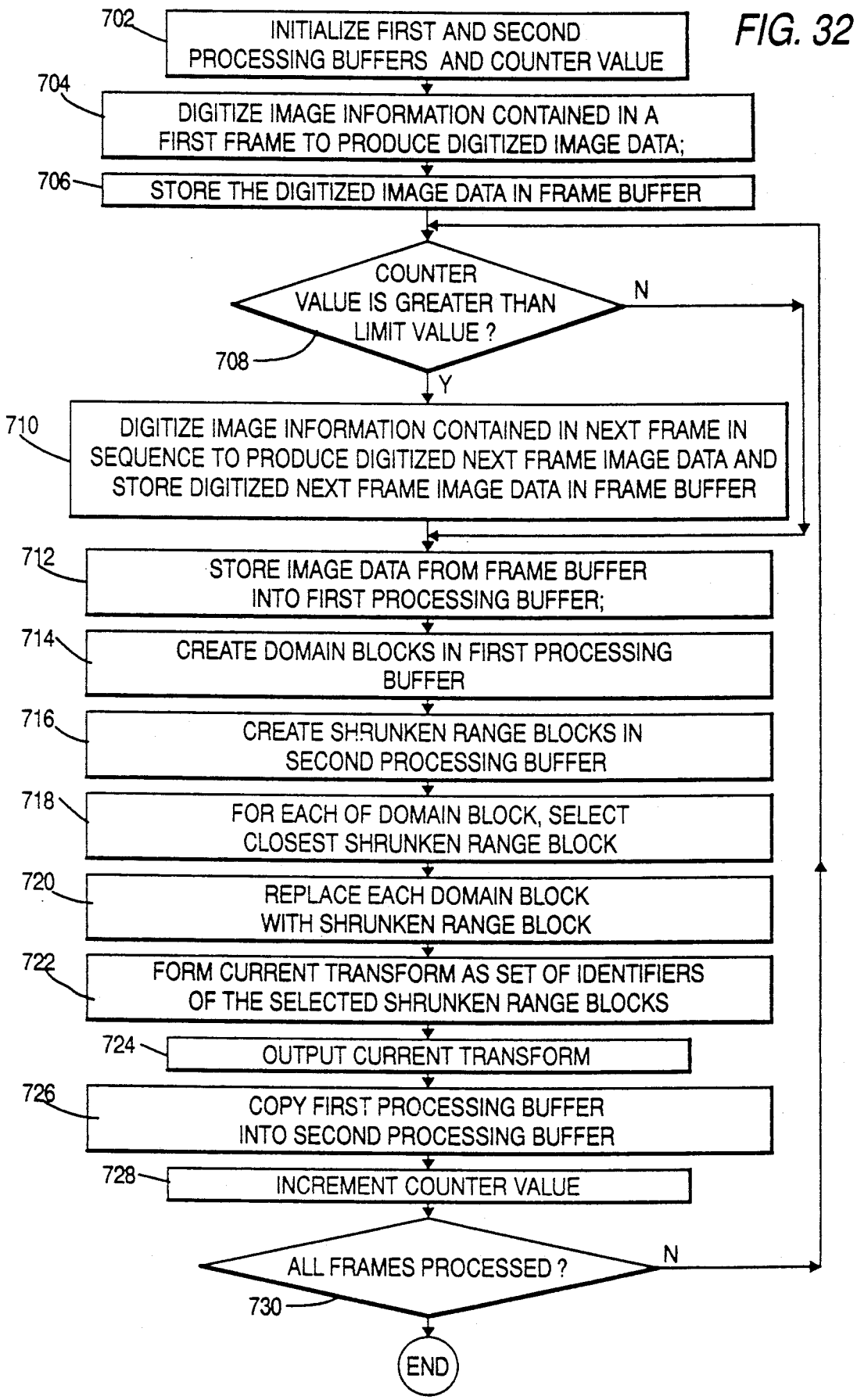
FIG. 32 is a logic flow chart of a method for generating compressed digital data representing image information in a motion picture.

The disclosed methods and apparatus are particularly suitable for application to the problem of transmitting movies over standard telephone lines. FIG. 32 is a logic flow chart of a method for generating compressed digital data representing image information in a motion picture, by a data processor, for storage or transmission. At step 702, first and second processing buffers are initialized with predetermined image data. In the preferred embodiment, the processing buffers are initialized to values of 0. Preferably, the processing buffers are formed to store grayscale pixel values of a square image array. In the preferred embodiment, the processing buffers provide storage of a 256×256 array of 8-bit pixels. The value of a counter in the data processor is also initialized at step 702.

Next, at step 704, image information contained in the first frame of the motion picture to be processed is digitized to produce digitized image data. The image information may be digitized at the same resolution as the processing buffers. In the preferred embodiment, the image information from the first frame of the movie is digitized into a 256×256 array of pixels having an 8-bit grayscale value.

At step 706, the digitized image data from the first frame of the movie is stored in a frame buffer. The counter value is then checked to determine if the value is greater than a predetermined limit value. The counter is used for the purpose of repeating the processing of the first frame for a fixed number of times, for example, 8. That is, the limit value referred to in step 708 is set to 8. If the counter value is greater than the limit value, image information from the next sequential frame of the movie is digitized to produce digitized next frame image data and the digitized next frame image data is stored in a frame buffer. If the counter value is not greater than the limit value, as determined in step 708, step 710 is bypassed, with the result that image data from the first frame remains in the frame buffer.

At step 712, image data from the frame buffer is stored into the first processing buffer. This image data is then processed in the same manner as set forth in FIG. 5. Specifically, domain blocks are created in step 714. Next, at step 716, shrunken range blocks are created in the second processing buffer. For each domain block, the closest shrunken range block is selected at step 718 and the selected shrunken range block is used to replace the corresponding domain block in the first processing buffer at step 720.

The set of identifiers of the selected shrunken range blocks is then used at step 722 to form a fractal transform such as fractal transform 410, shown in FIG. 26. This fractal transform is referred to as a current transform. The current transform, which comprises compressed digital data representative of the image information in the first frame of the movie, is then provided as output at step 724, and the contents of the first processing buffer are copied into the second processing buffer at step 726.

At step 728, the counter value is incremented and a determination is made at block 730 if all frames of the movie have been processed. If not, processing returns to step 708. If all frames have been processed, the method ends at 732.

Figure 33:
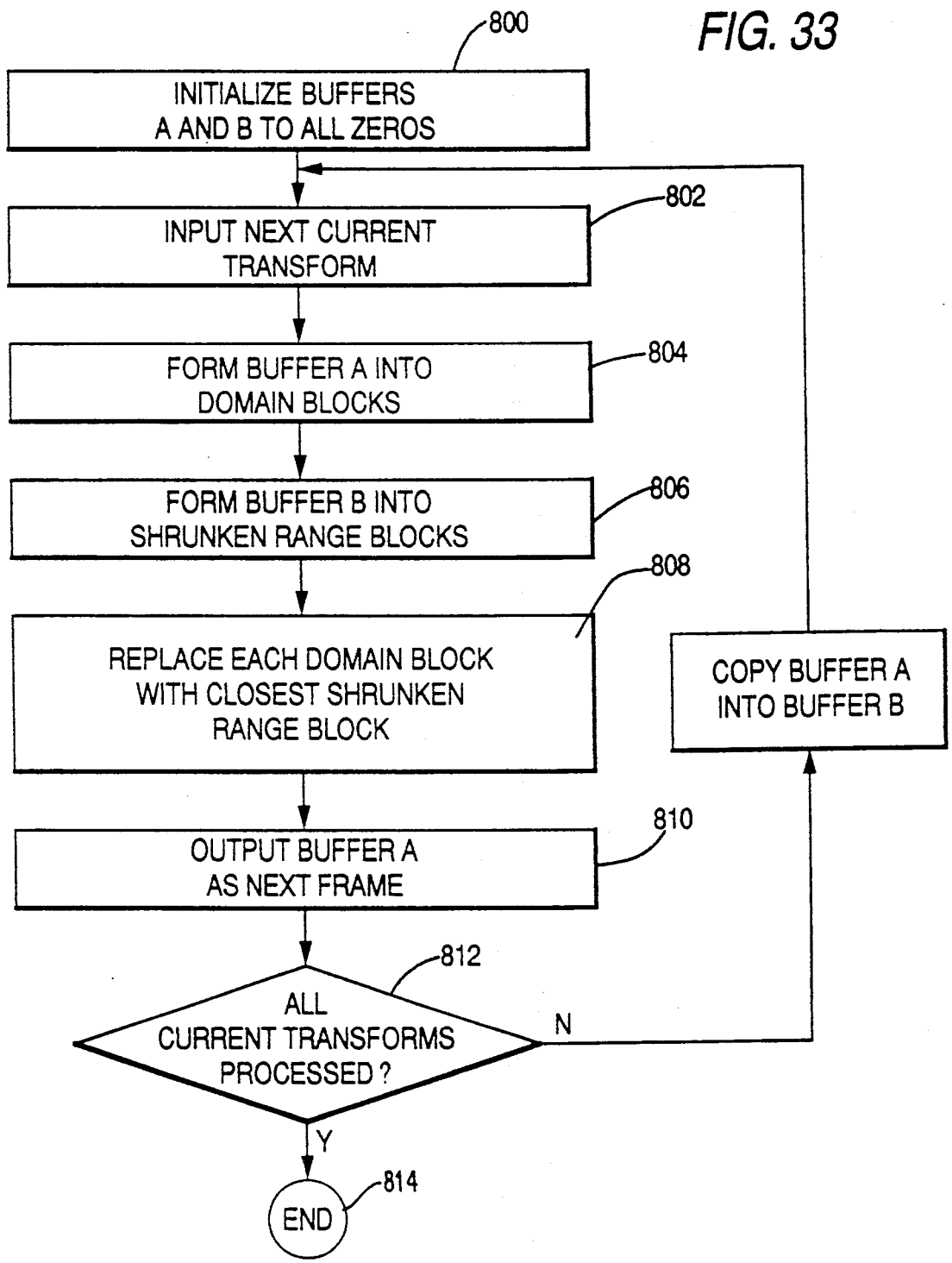
FIG. 33 is a logic flow chart of a method for automatically generating digital data representing frames of a motion picture.

Referring now to FIG. 33, there is shown a logic flow chart of a method for automatically generating digital data representing the frames of a motion picture. The data is generated by a data processor from a sequence of current transforms, each having a set of identifiers. The data processor includes a memory having a plurality of buffers, each having a plurality of addressable areas specified by a buffer address. Each of the identifiers corresponds to an addressable area in the buffers and includes a buffer address and a procedures specification. In the preferred embodiment, a pair of buffers A and B are provided, corresponding in size to the processing buffers discussed with respect to FIG. 32. Specifically, buffers A and B in the preferred embodiment each have a size sufficient to store an array of 256×256 by 8 bits.

At step 800, an initialization step is performed in which a predetermined pattern of digital data is stored into at least one of the buffers, buffer B, designated as a source buffer. Preferably, both buffers A and B are initialized to all 0's. A current transform, preferably generated by a process such as shown in FIG. 32, is input at step 802 from the sequence of current transforms which constitute compressed digital data representing a motion picture. At step 804, the digital data in buffer A is formed into domain blocks, each corresponding to an identifier in the input current transform. At step 806, the digital data in buffer B is formed into shrunken range blocks, in the same manner as is discussed above with respect to FIG. 13. At step 808, each domain block in buffer A is replaced by a shrunken range block. Specifically, for each of the identifiers in the current transform input at block 802, a pattern of data is determined which corresponds to each of the identifiers. This pattern of data is determined by applying the procedures specified in that identifier to the portion of the source buffer, buffer B, indicated by the buffer address in the identifier. Next at step 808, the patterns of data are stored into the addressable areas of buffer A, designated as a destination buffer, as indicated by the addresses of the corresponding identifiers. In the preferred embodiment, each domain block of buffer A is replaced by a shrunken range block of buffer B. This process is identical to that described above with respect to FIG. 13.

Next, at step 810, the contents of the destination buffer are provided as data representative of an image in the frame. That is, image data from buffer A is output as digital data representative of an image in the frame. This image corresponds to the frame represented by the current transform input in step 802.

At step 812, a determination is made as to whether all current transforms have been processed; that is, have images corresponding to all desired frames been processed. If so, the process ends at step 814. Otherwise, the contents of the destination buffer are copied into the source buffer. That is, as shown at step 816, the contents of buffer A are copied into buffer B and processing returns to step 802 to decompress the next current transform of the sequence. The sequence of sets of image data output at step 810 constitutes decompressed image data representing each frame of a motion picture.

The principles of the present invention are also particularly suitable for application to a videophone. FIG. 34 is a block diagram of apparatus 1000 for providing a videophone. Apparatus 1000 includes two latch-and-hold inputs units 1011 and 1012, a control logic unit 1013, two data processors 1014 and 1015 (respectively functioning as a videophone encoder and a videophone decoder), and two output units 1017. Apparatus 1000 has two functional modes: encoding and decoding. Control logic unit 1013 selects either the encoding mode or the decoding mode as determined by input data.

In the encoding mode, a video source 1002, such as a video camera, provides an analog signal to a frame grabber circuit 1006 which converts each frame of video from source 1002 into digital data and stores the digital data in frame grabber circuit 1006. Control logic unit 1013 causes video input unit 1011 to read digital data stored in frame grabber circuit 1006 and pass the data to videophone encoder 1014. Videophone encoder 1014 is a fractal encoder of the type described previously with respect to FIG. 6. Videophone encoder 1014 processes the digital video data which it receives from control logic unit 1013. This processing produces fractal transforms for the frames, which are then output through data output unit 1016. Data output unit 1016 may be a standard telephone modem circuit.

In the decoding mode, fractal transforms are supplied by a data source 1004, which may also be a standard telephone modem circuit. Control logic unit 1013 causes data input unit 1012 to read and accumulate the data supplied by data source 1004 and pass it to videophone decoder 1015. Videophone decoder 1015 is a fractal decoder of the type described with respect to FIG. 14. Videophone decoder 1015 processes the fractal transforms which are received from control logic unit 1013. The processing results in digital video data which is sent from decoder 1015 to video output unit 1017. This output unit transforms the digital data into analog data for display on the video display unit 1020.

The present invention provides data compression methods and apparatus which exhibit higher performance than prior art methods and apparatus. Moreover, the present invention avoids the necessity for hour of manual operation of a computer to achieve compressed data. Since look-up tables are not required, the present invention can provide adaptive capabilities, while minimizing the amount of memory required.

The invention provides the ability to represent and store images in a digital computer with scale-independent resolution using a two-dimensional array of numerical attributes of a digitized picture as input and providing an output which is a smaller data set from the original. The present invention can provide both exact and non-exact image representation by choice of appropriate block sizes and screen resolution.

The invention further provides the ability to subject image data to multiple passes of an encoding and decoding process such that the image data emerges the same as if it had been encoded and decoded only once.

It will be apparent to those skilled in the art that various modifications and variations can be made in the apparatus and methods of this invention without departing from the spirit or scope of the present invention. The present invention covers such modifications and variations which are within the scope of the appended claims and their equivalents.

What is claimed is:

1. A method for automatically processing digital image data consisting of image information, the method comprising the steps performed by a data processor of:
   storing the image data in the data processor;
   generating a plurality of uniquely addressable domain blocks from the stored image data, each of the domain blocks representing a different portion of the image information such that all of the image information is contained in at least one of the domain blocks;
   creating, from the stored image data, a plurality of uniquely addressable mapped range blocks corresponding to different subsets of the stored image data with each of the subsets having a unique address, the creating step including the substep of executing, for each of the mapped range blocks, a corresponding procedure upon the one of the subsets of the stored image data which corresponds to the mapped range block;
   assigning unique identifiers to corresponding ones of the mapped range blocks, each of the identifiers specifying for the corresponding mapped range block a procedure and a address of the corresponding subset of the stored image data;
   selecting, for each of the domain blocks, the one of the mapped range blocks which most closely corresponds according to predetermined criteria; and
   representing the image information as a set of the identifiers of the selected mapped range blocks.

2. A method as recited in claim 1 wherein the digital image data consists of a plurality of pixels and wherein the step of generating the domain blocks includes the substep of generating the domain blocks with unequal numbers of pixels.

3. A method as recited in claim 1 wherein the digital image data consists of a plurality of pixels and wherein the step of generating the domain blocks includes the substep of generating the domain blocks each with the same number of pixels.

4. A method as recited in claim 1 wherein the step of creating a plurality of uniquely addressable mapped range blocks includes the substeps of:
   creating a plurality of initial range blocks having greater numbers of pixels than the domain blocks;
   shrinking the initial range blocks to create shrunken range blocks which have the same number of pixels as the domain blocks; and
   using the shrunken range blocks to form the mapped range blocks.

5. A method as recited in claim 4 wherein the step of shrinking comprises the substep of selecting certain ones of the pixels of each initial range block to form a corresponding shrunken range block.

6. A method as recited in claim 5 wherein the substep of selecting pixels includes the substep of selecting pixels equally spaced in the initial range blocks.

7. A method as recited in claim 4 wherein the shrinking step includes the substep of averaging adjacent pixels.

8. A method as recited in claim 3 wherein the step of creating a plurality of uniquely addressable mapped range blocks includes the substep of:
   rotating the mapped range blocks by a predetermined number of degrees.

9. A method as recited in claim 3 wherein the step of creating a plurality of uniquely addressable mapped range blocks includes the substep of inverting the mapped range block.

10. A method as recited in claim 1 wherein the step of generating the domain blocks includes the substep of assigning each portion of the stored image information to only one of the domain blocks such that the domain blocks are non-overlapping.

11. A method as recited in claim 1 wherein the step of selecting the mapped range blocks includes the substep of selecting, for each domain block, a most closely corresponding one of the mapped range blocks.

12. A method as recited in claim 11 wherein the step of selecting the most closely corresponding one of the mapped range blocks includes the step of selecting, for each domain block, the mapped range block which has the minimum Hausdorff distance from the domain block.

13. A method as recited in claim 11 wherein the step of selecting the most closely corresponding one of mapped range blocks includes the step of selecting, for each domain block, the mapped range block with the minimum modified Hausdorff distance calculated as $D[db, mrb] + D[1-db, 1-mrb]$, where D is a distance calculated between a pair of sets of data each representative of an image, db is a domain block, mrb is a mapped range block, 1−db is the inverse of a domain block, and 1-mrb is an inverse of a mapped range block.

14. A method as recited in claim 1 wherein the step of selecting the most closely corresponding one of the mapped range blocks includes the substeps of:
   calculating, for each of the domain blocks, the mapped weighted $L^2$ distance $D_L$ from each of the range blocks as $$D_L = \sqrt{\sum_{i=1}^{N} |x_i - y_i|^2 w_i}$$

where
$x_i, y_i$ are indexed intensity values in respective images, $w_i$ are non-negative numbers, and N is the number of pixels in each domain block; and selecting, for each domain block, the mapped range block with the minimum weighted $L^2$ distance.

15. A method as recited in claim 1 wherein the step of creating mapped range blocks includes the step of creating a mapped range block comprising an escape block having the same size as the mapped range blocks and containing digital data representing an all white image.

16. A method for automatically processing digital image data consisting of a plurality of pixels each having one of a plurality of grayscale values, the method comprising the steps performed by a data processor of:
   storing the image data in the data processor;
   generating a plurality of uniquely addressable domain blocks from the stored image data, each of the domain blocks representing a different portion of the image information such that all of the image information is contained in at least one of the domain blocks;
   creating, from the stored image data, a plurality of uniquely addressable mapped range blocks corresponding to different subsets of the stored image data with each of the subsets having a unique address, the creating step including the substep of executing, for each of the mapped range blocks, a corresponding procedure upon the one of the subsets of the stored image data which corresponds to the mapped range block;
   assigning unique identifiers to corresponding ones of the mapped range blocks, each of the identifiers specifying for the corresponding mapped range block a procedure and an address of the corresponding subset of stored image data;
   selecting, for each of the domain blocks the one of the mapped range blocks which most closely corresponds according to a first predetermined criteria; and
   representing the image information as a set of the identifiers of the selected mapped range blocks.

17. A method as recited in claim 16 wherein the step of selecting includes the substeps of:
   transforming the grayscale values of the pixels of each domain block by a linear function including at least one vertical scaling parameter;
   transforming the grayscale values of the pixels of the shrunken range blocks by the linear function;
   selecting, for each of the domain blocks, the one of the mapped range blocks having transformed pixel values which most closely corresponds to the transformed pixel values of the domain block according to the first predetermined criteria;
   and wherein the step of representing the image information includes the substep of representing the image information as a set of values each including an identifier of the selected mapped range block and the at least one vertical scaling parameter.

18. A method as recited in claim 17 wherein the first criteria comprises minimizing the Hausdorff distance between each domain block and the selected shrunken range block.

19. A method as recited in claim 17 wherein the substeps of transforming pixel values of the domain blocks and shrunken range blocks comprises selecting the at least one vertical scaling parameter to maximize the correspondence between the domain blocks and shrunken range blocks according to a second predetermined criteria.

20. A method as recited in claim 19 wherein the first and second predetermined criteria are different.

21. A method as recited in claim 20 wherein the second predetermined criteria comprises minimizing the $L^2$ distance between the domain blocks and the shrunken range blocks.

22. A method for automatically processing digital image data consisting of image information in a data processor which includes a memory having a plurality of buffers each having a plurality of addressable areas specified by a buffer address, the method comprising the steps of:
   storing the image data in the data processor;
   generating a plurality of uniquely addressable domain blocks from the stored image data, each of the domain blocks representing a different portion of the image information such that all of the image information is contained in at least one of the domain blocks;
   creating, from the stored image data, a plurality of uniquely addressable mapped range blocks corresponding to different subsets of the stored image data with each of the subsets having a unique address, the creating step including the substep of executing, for each of the mapped range blocks, a corresponding procedure upon the one of the subsets of the stored image data which corresponds to the mapped range block;
   assigning unique identifiers to corresponding ones of the mapped range blocks, each of the identifiers corresponding to an addressable area in the buffers and including both a procedure and a buffer address;
   selecting, for each of the domain blocks the one of the mapped range blocks which most closely corresponds according to predetermined criteria; and
   representing the image information as a set of the selected identifiers;
   storing a predetermined pattern of digital data in one of the buffers designated as a source buffer;
   determining, for each of the identifiers, a pattern of data corresponding to each identifier by applying the procedure in that identifier to the portion of the source buffer indicated by the buffer address in that identifier;
   storing the pattern of data into the addressable area of another one of the buffers, designated as a destination buffer, indicated in the corresponding identifier;
   repeating the determining and destination buffer storing steps, with the destination buffer being considered as the source buffer, until predetermined criteria are met; and
   providing the contents of the destination buffer as data representative of an image when the predetermined criteria are met.

23. A method for automatically enhancing digital image data in a data processor which includes a memory having a plurality of buffers each having a plurality of addressable areas specified by a buffer address, the image data consisting of image information at a first resolution, the method comprising the steps of:
   storing the image data in a first one of the buffers;
   generating a plurality of uniquely addressable domain blocks from the stored image data, each of the domain blocks representing a different portion of the image information such that all of the image information is contained in at least one of the domain blocks;

creating, from the stored image data, a plurality of uniquely addressable mapped range blocks corresponding to different subsets of the stored image data with each of the subsets having a unique address, the creating step including the substep of executing, for each of the mapped range blocks, a corresponding procedure upon the one of the subsets of the stored image data which corresponds to the mapped range block;

assigning unique identifiers to corresponding ones of the mapped range blocks, each of the identifiers corresponding to an addressable area in the buffers and including both a procedure and a buffer address;

selecting, for each of the domain blocks the one of the mapped range blocks which most closely corresponds according to predetermined criteria; and representing the image information as a set of the selected identifiers;

storing a predetermined pattern of digital data in a second one of the buffers designated as a source buffer, the second buffer being larger than the first buffer;

determining, for each of the identifiers, a pattern of data corresponding to each identifier by applying the procedure in that identifier to the portion of the source buffer indicated by the buffer address in that identifier;

storing the pattern of data into the addressable area of a third one of the buffers, designated as a destination buffer, indicated in the corresponding identifier, the third buffer being larger than the first buffer;

repeating the determining and destination buffer storing steps, with the destination buffer being considered as the source buffer, until predetermined criteria are met; and providing the contents of the destination buffer as output image data when the predetermined criteria are met, the output image data being representative of the input image at a second resolution higher than the first resolution.

24. A method for automatically generating an image by a data processor from a set of identifiers, the data processor including a memory having a plurality of buffers each having a plurality of addressable areas specified by a buffer address, and each of the identifiers corresponding to an addressable area in the buffers and including a buffer address and a procedure specification, the method comprising the steps, performed by a data processor, of:

storing a predetermined pattern of digital data in one of the buffers designated as a source buffer;

determining, for each of the identifiers, a pattern of data corresponding to each identifier by applying the procedure specified in that identifier to the portion of the source buffer indicated by the buffer address in that identifier;

storing the patterns of data into the addressable area of another one of the buffers, designated as a destination buffer, indicated in the corresponding identifier;

repeating the determining and destination buffer storing steps, with the destination buffer being considered as the source buffer, until predetermined criteria are met; and providing the contents of the destination buffer as data representative of an image when the predetermined criteria are met.

25. A method as recited in claim 24 wherein the step of providing the contents of the destination buffer when the predetermined criteria are met includes the substep of determining when the contents of the source and destination buffers differ by less than a predetermined amount.

26. A method as recited in claim 24 wherein the step of providing the contents of the destination buffer as data representative of an image when the predetermined criteria are met includes the steps of determining and storing into the destination buffer a predetermined number of times.

27. A method as recited in claim 24 wherein the step of storing digital data into the destination buffer includes the step of storing at least one of the patterns into each addressable area of the destination buffer.

28. A method for automatically generating an image by a data processor from a set of identifiers, the data processor including a memory having a plurality of buffers each having a plurality of addressable areas specified by a buffer address, and each of the identifiers corresponding to an addressable area in the buffers and including a buffer address, the method comprising the steps, performed by a data processor, of:

storing a predetermined pattern of digital data in one of the buffers designated as a source buffer;

determining, for each of the identifiers, a pattern of data corresponding to each identifier by the portion of the source buffer indicated by the buffer address in that identifier;

storing the patterns of data into the addressable area of another one of the buffers, designated as a destination buffer, indicated in the corresponding identifier;

repeating the determining and destination buffer storing steps, with the destination buffer being considered as the source buffer, until predetermined criteria are met; and providing the contents of the destination buffer as data representative of an image when the predetermined criteria are met.

29. A method for generating an image by a data processor from a set of identifiers, the data processor including a memory having a buffer with a plurality of addressable areas specified by a buffer address, and each of the identifiers corresponding to an addressable area in the buffer and including both a procedure and a buffer address, the method comprising the steps, performed by a data processor, of:

storing a predetermined pattern of digital data in the buffer;

determining, for each of the identifiers, a pattern of data corresponding to each identifier by applying the procedure specified in that identifier to the portion of the buffer indicated by the buffer address in that identifier;

storing the patterns of data into the addressable areas indicated in the corresponding identifiers;

repeating the determining and buffer storing steps until predetermined criteria are met; and providing the contents of the buffer as data representative of an image when the predetermined criteria are met.

30. A method for automatically generating a digital data representation of a motion picture having a plurality of individual sequential frames each containing frame image information, comprising the steps performed by a data processor of:

initializing first and second processing buffers in the data processor;

digitizing image information contained in a frame to produce digitized image data;

storing the digitized image data into the first processing buffer;

creating in the first processing buffer a plurality of uniquely addressable domain blocks from the stored image data of the first processing buffer, each of the domain blocks representing a different portion of the frame image information such that all of the frame image information is contained in at least one of the domain blocks;

creating in the second processing buffer, from the data stored in the second processing buffer, a plurality of uniquely addressable mapped range blocks corresponding to different subsets of the stored second processing buffer data with each of the subsets having a unique address, the creating step including the substep of executing, for each of the mapped range blocks, a corresponding procedure upon the one of the subsets of the second processing buffer data which corresponds to the mapped range block;

assigning unique identifiers to corresponding ones of the mapped range blocks, each of the identifiers specifying for the corresponding mapped range block a procedure and an address of the corresponding subset of stored second processing buffer data;

selecting, for each of the domain blocks of the first processing buffer, the one of the mapped range blocks of the second processing buffer which most closely corresponds according to predetermined criteria;

replacing each of the domain blocks with the corresponding selected mapped range block;

forming a current transform as a set of the identifiers of the selected mapped range blocks;

copying the contents of the first processing buffer into the second processing buffer;

repeating the digitizing, storing, first and second processing buffer creating, assigning, selecting, replacing, forming, and copying steps until all of the frames have been digitized; and supplying the sequence of current transforms for each of the frames as a compressed representation of image information in the motion picture.

31. A method as recited in claim 30 wherein image data from the first frame is repeatedly processed a predetermined number of times to produce a series of current transforms representative of the first frame, and image data from each succeeding frame is processed once to produce a single current transform representative of each succeeding frame.

32. A method for automatically generating digital data representing the frames of a motion picture by a data processor from a sequence of current transforms each having a set of identifiers comprising compressed digital data representative of the frames, the data processor including a memory having a plurality of buffers each having a plurality of addressable areas specified by a buffer address, and each of the identifiers corresponding to an addressable area in the buffers and including a buffer address and a procedure specification, the method comprising the steps, performed by the data processor, of:

initializing a predetermined pattern of digital data into one of the buffers designated as a source buffer;

inputting a current transform and storing the current transform in another of the buffers designated as the destination buffer;

determining, for each of the identifiers, a pattern of data corresponding to each identifier by applying the procedure specified in that identifier to the portion of the source buffer indicated by the buffer address in that identifier;

storing the patterns of data into the addressable areas of the destination buffer which are specified by the corresponding identifiers;

providing the contents of the destination buffer as data representative of an image in a frame;

copying the contents of the destination buffer into the source buffer; and repeating the inputting, determining, storing, providing, and copying steps for each current transform of the sequence.

33. Apparatus for generating compressed digital data representative of frames of video image information to be transmitted over a standard telephone line, comprising:

frame grabber means for receiving video data and for storing frame data comprising image data representative of image information in a single frame of video data;

a video encoder, the video encoder comprising means for:

storing the image data in the video encoder;

generating a plurality of uniquely addressable domain blocks from the stored image data. each of the domain blocks representing a different portion of the image information such that data representing all of the image information is contained in at least one of the domain blocks, creating, from the stored image data, a plurality of uniquely addressable mapped range blocks corresponding to different subsets of the stored image data with each of the subsets having a unique address, the creating step including the substep of executing, for each of the mapped range blocks, a corresponding procedure upon the one of the subsets of the stored image data which corresponds to the mapped range block;

assigning unique identifiers to corresponding ones of the mapped range blocks, each of the identifiers specifying for the corresponding mapped range block a procedure and an address of the corresponding subset of image data, selecting, for each of the domain blocks, the one of the mapped range blocks which most closely corresponds according to predetermined criteria and representing the image information as a set of the identifiers of the selected mapped range blocks; and control means coupled to the frame grabber means and the video encoder for supplying the frame data to the video encoder and for commanding the video encoder to generate compressed digital data comprising the set of the identifiers of the selected mapped range blocks representing the frame data.

34. Apparatus for producing video data for display on a video output device from a sequence of current transforms received over a standard telephone line and each having a set of identifiers comprising compressed digital data representative of the frames, comprising:
- a data input circuit for receiving and accumulating the compressed digital data;
- a video decoder coupled to the data input circuit, the video decoder comprising:
  - a memory having a plurality of buffers each having a plurality of addressable areas specified by a buffer address, and each of the identifiers corresponding to an addressable area in the buffers and including a buffer address and a procedure specification, and means for:
    - storing a predetermined pattern of digital data in one of the buffers designated as a source buffer,
    - determining, for each of the identifiers, a pattern of data corresponding to each identifier by applying the procedure specified in that identifier to the portion of the source buffer indicated by the buffer address in that identifier,
    - storing the patterns of data into the addressable area of another one of the buffers, designated as a destination buffer, indicated in the corresponding identifier, and
    - providing the contents of the destination buffer as decompressed digital data representative of a frame of image information;
- a video output circuit coupled to the video decoder for converting digital data into signals for display of an image on a video display device; and
- control means coupled to the data input circuit and the video decoder for supplying the accumulated digital data to the video decoder and for commanding the video decoder to produce and supply the decompressed digital data to the video output circuit.

35. A method for automatically processing digital image data consisting of image information, the method comprising the steps performed by a data processor of:
- storing the image data in the data processor;
- generating a plurality of uniquely addressable domain blocks from the stored image data, each of the domain blocks representing a different portion of the image information such that all of the image information is contained in at least one of the domain blocks;
- creating, from the stored image data, a plurality of uniquely addressable mapped range blocks corresponding to different subsets of the stored image data with each of the subsets having a unique address, the creating step including the substep of executing, for each of the mapped range blocks, a procedure upon the one of the subsets of the stored image data which corresponds to the mapped range block;
- assigning unique identifiers to corresponding ones of the mapped range blocks, each of the identifiers specifying for the corresponding mapped range block an address of the corresponding subset of stored image data;
- selecting, for each of the domain blocks, the one of the mapped range blocks which most closely corresponds according to predetermined criteria; and
- representing the image information as a set of the identifiers of the selected mapped range blocks.

36. A method for automatically processing digital image data consisting of a plurality of pixels each having one of a plurality of grayscale values, the method comprising the steps performed by a data processor of:
- storing the image data in the data processor;
- generating a plurality of uniquely addressable domain blocks from the stored image data, each of the domain blocks representing a different portion of the image information such that all of the image information is contained in at least one of the domain blocks;
- creating, from the stored image data, a plurality of uniquely addressable mapped range blocks corresponding to different subsets of the stored image data with each of the subsets having a unique address, the creating step including the substep of executing, for each of the mapped range blocks, a corresponding procedure upon the one of the subsets of the stored image data which corresponds to the mapped range block;
- assigning unique identifiers to corresponding ones of the mapped range blocks, each of the identifiers specifying for the corresponding mapped range block an address of the corresponding subset of stored image data;
- selecting, for each of the domain blocks the one of the mapped range blocks which most closely corresponds according to a first predetermined criteria; and
- representing the image information as a set of the identifiers of the selected mapped range blocks.

37. Apparatus for automatically processing digital image data consisting of image information, comprising:
- means for storing the image data;
- means for generating a plurality of uniquely addressable domain blocks from the stored image data, each of the domain blocks representing a different portion of the image information such that all of the image information is contained in at least one of the domain blocks;
- means for creating, from the stored image data, a plurality of uniquely addressable mapped range blocks corresponding to different subsets of the stored image data with each of the subsets having a unique address, the creating means including means for executing, for each of the mapped range blocks, a procedure upon the one of the subsets of the stored image data which corresponds to the mapped range block;
- means for assigning unique identifiers to corresponding ones of the mapped range blocks, each of the identifiers specifying for the corresponding mapped range block an address of the corresponding subset of stored image data;
- means for selecting, for each of the domain blocks, the one of the mapped range blocks which most closely corresponds according to predetermined criteria; and
- means for representing the image information as a set of the identifiers of the selected mapped range blocks.

38. Apparatus as recited in claim 37, wherein the means for assigning unique identifiers comprises means for assigning unique identifiers to corresponding ones of the mapped range blocks, each of the identifiers specifying for the corresponding mapped range block a procedure and an address of the corresponding subset of stored image data.

* * * * *